United States Patent
Takahashi et al.

(10) Patent No.: US 10,090,752 B2
(45) Date of Patent: Oct. 2, 2018

(54) POWER CONVERSION DEVICE

(71) Applicant: DENSO CORPORATION, Kariya, Aichi-pref. (JP)

(72) Inventors: Masaya Takahashi, Kariya (JP); Eisuke Takahashi, Kariya (JP); Takuya Kiguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/855,168

(22) Filed: Dec. 27, 2017

(65) Prior Publication Data
US 2018/0212510 A1 Jul. 26, 2018

(30) Foreign Application Priority Data

Jan. 26, 2017 (JP) .................. 2017-012434

(51) Int. Cl.
*G05F 1/00* (2006.01)
*H02M 1/08* (2006.01)
*H02M 7/5387* (2007.01)
*H02J 7/00* (2006.01)
H02P 27/08 (2006.01)
H02M 1/00 (2006.01)
H02M 7/48 (2007.01)

(52) U.S. Cl.
CPC .......... *H02M 1/083* (2013.01); *H02J 7/0065* (2013.01); *H02M 7/53871* (2013.01); *H02M 2001/0058* (2013.01); *H02M 2007/4815* (2013.01); *H02P 27/08* (2013.01)

(58) Field of Classification Search
CPC .......... G01F 1/562; G01F 1/565; G01F 1/575; H02M 3/142; H02M 3/158

USPC .................. 323/242, 243, 274, 282–284, 288
See application file for complete search history.

(56) References Cited

U.S. PATENT DOCUMENTS

| | | | |
|---|---|---|---|
| 5,633,793 A | 5/1997 | Lee et al. | |
| 2004/0066178 A1* | 4/2004 | Mizoguchi | ............ H02M 3/158 323/205 |
| 2006/0158911 A1* | 7/2006 | Lincoln | .................. H02H 7/122 363/56.01 |

(Continued)

FOREIGN PATENT DOCUMENTS

| | | |
|---|---|---|
| JP | H06-269164 A | 9/1994 |
| JP | H08-070583 A | 3/1996 |
| JP | 2015-095935 A | 5/2015 |

*Primary Examiner* — Gary Nash
(74) *Attorney, Agent, or Firm* — Oliff PLC

(57) ABSTRACT

A power conversion device has a main switch connected to a positive electrode side line of a battery, at least one semiconductor power element connected between the main switch and a negative electrode voltage line, and an auxiliary circuit having an auxiliary switch, a resonance reactor and an auxiliary diode connected parallel to the main switch. The device further has a voltage detection part which detects an external side voltage of the main switch and a control circuit part performing a switching control of the main switch and the auxiliary switch based on the detection result of the voltage detection part. During the turned-off state of the main switch, the control circuit part turns off the auxiliary switch before the external side voltage of the main switch reaches an input voltage of the main switch. This external side voltage starts to increase when the auxiliary switch is turned on.

14 Claims, 21 Drawing Sheets

(56) References Cited

U.S. PATENT DOCUMENTS

2010/0060245 A1* 3/2010 Namuduri ............ H02M 7/219
                                                    322/89
2011/0181261 A1* 7/2011 Kalechshtein .......... H02M 1/34
                                                    323/284

* cited by examiner

Sas:ON

Sas:OFF

POWER CONVERSION DEVICE

CROSS-REFERENCE TO RELATED APPLICATION

This application is related to and claims priority from Japanese Patent Application No. 2017-012434 filed on Jan. 26, 2017, the contents of which are hereby incorporated by reference.

BACKGROUND OF THE INVENTION

1. Field of the Invention

The present invention relates to power conversion devices capable of converting an electric power of a power source device such as a battery to a drive power so as to drive an electric motor, etc.

2. Description of the Related Art

For example, a power conversion device is used for converting an electric power of a power source device to a drive power so as to drive an electric motor, etc. There are various types of the power conversion devices, for example, an inverter, and a converter.

A switching loss is generated in a power conversion device due to a switching operation of turning ON/OFF switching elements in the power conversion device. In order to reduce such a switching loss, there has been proposed a technique to perform zero-voltage switching (hereinafter, referred to as the "ZVS") to reduce the switching loss. The technique uses a resonance phenomenon of a reactor and a capacitor.

Patent document 1, Japanese patent NO. 3207431, shows a zero-voltage transition voltage source inverter capable of converting a direct current power of a direct current power source to a three phase alternating current power. The zero-voltage transition voltage source inverter has a switching bridge and an auxiliary circuit. The switching bridge is arranged between input terminals of the direct current power source and output terminals of the three phase alternating current power. The auxiliary circuit is arranged between input terminals of the direct current power source and the switching bridge.

The auxiliary circuit is composed of a rail switch, a series connection part and an auxiliary diode. The rail switch is connected to a direct current rail of the input terminals of the direct current power source. The series connection part is composed of a resonance inductor and an auxiliary switch. A first terminal of the auxiliary diode is connected to a connection node between the auxiliary switch and the resonance inductor. A second terminal of the auxiliary diode is grounded.

In the control method disclosed in Patent document 1 previously described, the bridge switch of the bridge circuit is turned on when the rail switch of the direct current rail is in an OFF-state. Next, the rail switch is turned on at a timing t1 by the auxiliary circuit.

The auxiliary switch of the auxiliary circuit is turned on before time t1, energy capable of flowing a current is accumulated in the resonance inductor, and the auxiliary switch is turned off after the timing t1. The resonance switch resonates with the capacitor arranged between the bridge switch and the rail switch, and provides a zero current transition corresponding to the turn-on switching of the rail switch. After this, the bridge switch is turned off, and the rail switch is turned off.

However, the control method disclosed by the patent document 1 previously described provides an excessive current when the auxiliary switch operates in addition to a necessary current for the ZVS, and this increases a power loss of the auxiliary switch. There are various methods regarding a power consumption technique using the ZVS, for example, a feedback control method of adjusting a switching timing on the basis of current and voltage information so as to reduce the current as low as possible, or a method of detecting a load current and a current flowing in the auxiliary circuit by using a current sensor, and calculating the current on the basis of a logical expression the by using a control circuit, etc. However, when the control method cannot follow a rapid change of the load current and the ZVS does not correctly operate, the magnitude of the switching loss increases.

SUMMARY

It is therefore desired to provide an electric power conversion device capable of reducing a conductive loss, a diode loss and a switching loss, increasing a responsiveness of the zero-volt switching (ZVS) with high efficiency and high responsiveness.

An exemplary embodiment provides a power conversion device. The power conversion device has a battery, a main switch, one or more semiconductor power elements, an auxiliary circuit, a voltage detection part and a control circuit part. The battery is arranged between and connected to a positive electrode side voltage potential line and a negative electrode side voltage potential line. The battery supplying a direct current power. The main switch is connected to the positive electrode side voltage potential line. The semiconductor power element or the plurality of semiconductor power elements are arranged between and connected to the main switch and the negative electrode side voltage potential line. The auxiliary circuit 3 has an auxiliary switch, a resonance reactor and an auxiliary diode. The auxiliary switch and the resonance reactor are connected to the main switch. The auxiliary diode is connected to the negative electrode side voltage potential line and a connection node between the auxiliary switch and the resonance reactor. The voltage detection part is connected to an external side of the main switch to detect an external side voltage of the main switch. The control circuit part is connected to the voltage detection part, and configured to perform a switching control of the main switch and the auxiliary switch on the basis of a detection result transmitted from the voltage detection part. The control circuit part turns off the auxiliary switch before the external side voltage of the main switch reaches an input voltage supplied from the battery and received by the main switch. The external side voltage of the main switch increases due to a turned on of the auxiliary switch.

In the structure of the voltage conversion device according to the present invention, the control circuit part performs the switching control operation of the main switch and the auxiliary switch so as to adjust the current flowing in the current path through the battery as the input power source, the main switch or the auxiliary switch. The power converted power of the battery is supplied to an alternating current motor or a direct current motor as a load. During the switching control operation of the control circuit part, the voltage detection part detects the external side voltage of the main switch. During the turned-off state of the main switch, the auxiliary switch is turned off at a timing when the external side voltage, which increases due to the turned-on state of the auxiliary switch, does not reach the input voltage of the main switch as the voltage supplied by the battery.

This control operation makes it possible to discharge energy in the resonance reactor to the external side terminal of the main switch, this control operation makes it possible to increase the external side voltage of the main switch to be equal to the voltage supplied from the battery, i.e. to the input voltage of the main switch.

Because a difference between the input voltage and the external side voltage of the main switch can be reduced, this control makes it possible to perform the zero-voltage switching (ZVS). In addition, it is possible to turn off the main switch based on the ZVS operation before the difference between the input voltage and the external side voltage of the main switch increases. Accordingly, this control makes it possible to suppress the operation loss of the auxiliary circuit due to an excessive current flow and the switching loss of the main switch from increasing without using any complicated control. As a result, it is possible for the voltage conversion device according to the present invention having the improved structure to drastically reduce the total switching loss.

As previously described, the voltage conversion device according to the present invention reduces the conductive loss and the diode loss in the auxiliary circuit, and further reduces the switching loss, and improves the responsiveness of the ZVS control with high efficiency and high responsiveness.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
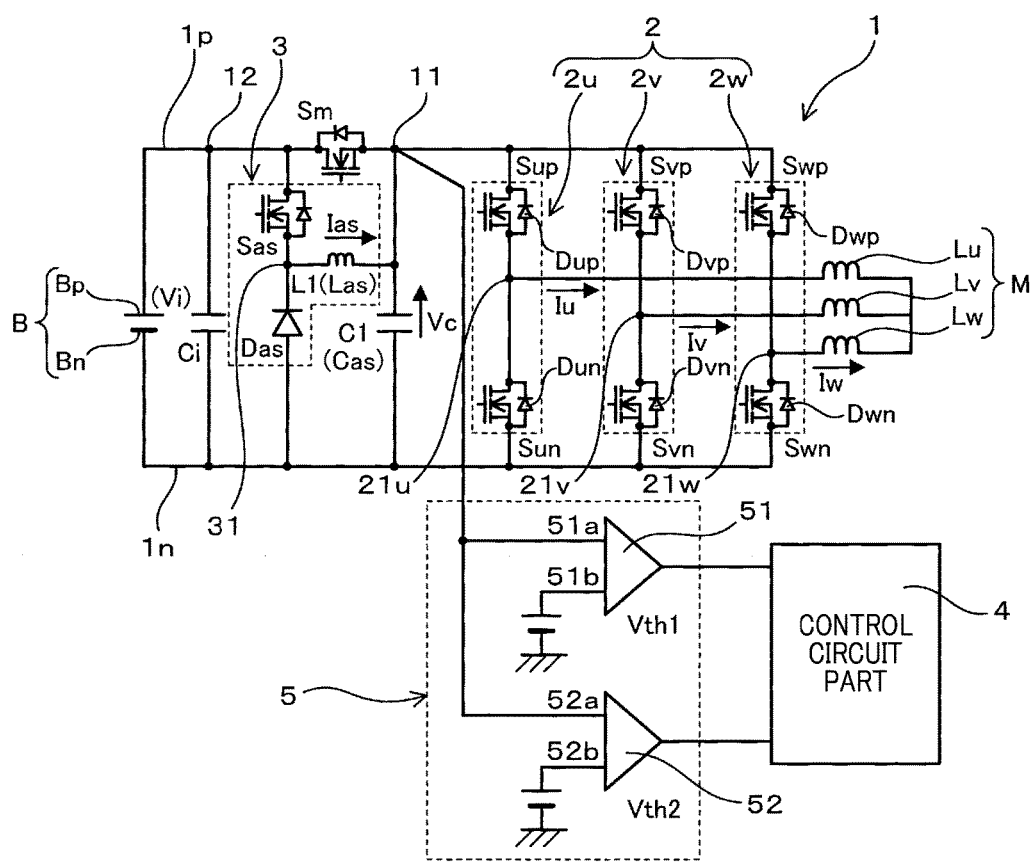
FIG. 1 is a circuit diagram showing a schematic structure of a power conversion device 1 according to a first exemplary embodiment.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of the power conversion device 1 according to a first exemplary embodiment with reference to FIG. 1 to FIG. 20.

FIG. 1 is a circuit diagram showing a schematic structure of the power conversion device 1 according to the first exemplary embodiment. As shown in FIG. 1, the power conversion device 1 according to the first exemplary embodiment has a battery B, a main switch Sm, an output circuit part 2, an auxiliary circuit 3, a control circuit part 4, and a voltage detection part 5.

For example, the battery B is a power source. The battery B supplies a direct current power having a voltage potential of 48 V, for example. The main switch Sm is connected to a positive electrode side voltage potential line $1p$ of the battery B. The battery B supplies the direct current power. An input terminal of the main switch B receives the direct current power. That is, the input terminal of the main switch Sm receives the input voltage Vi supplied from the battery Bs. The output circuit part 2 has not less than one of semiconductor power elements Sup, Svp, Swp, Sun, Svn and Swn. The auxiliary circuit 3 has an auxiliary switch Sas, a resonance reactor L1 and an auxiliary diode Das. The control circuit part 4 performs a switching control of the main switch Sm and the auxiliary switch Sas on the basis of a detection result of the voltage detection part 5. The voltage detection part 5 detects an external side voltage of the main switch Sm.

The output circuit part 2 is connected to an alternating current motor M, and supplies converted power to the alternating current power M. The semiconductor power elements Sup, Svp, Swp, Sun, Svn and Swn are arranged between the main switch Sm and a negative electrode side voltage line $1n$ to form a plurality of half bridge circuits $2u$, $2v$ and $2w$. The switching operation of the main switch Sm performs a power supply control from the semiconductor power elements Sup, Svp, Swp, Sun, Svn and Swn to the alternating current power M. A connection node 11 between the main switch Sm and the output circuit part 2 is connected to the resonance capacitor C1 and the plurality of half bridge circuits $2u$, $2v$ and $2w$.

The power conversion device 1 according to the first exemplary embodiment is mounted on a vehicle equipped with the alternating current motor M as a main drive motor, and converts a direct current voltage supplied from the battery B as a direct current power source to a predetermined alternating current power, and supplies the predetermined alternating current power to the alternating current power M. The alternating current power M has three phase (U phase, V phase and W phase) motor coils Lu, Lv and Lw. One terminal of each of the three phase motor coils Lu, Lv and Lw T is commonly connected.

The voltage detection part 5 receives a voltage (i.e. a capacitor voltage Vc), as the external side voltage of the main switch Sm, at a connection node between the main switch Sm and the output circuit part 2, and compares the received voltage with a predetermined threshold voltage, and outputs a comparison result to the control circuit part 4. Specifically, the voltage detection part 5 has a first comparator 51 and a second comparator 52. The first comparator 51 is used for detecting a turning-off timing of the auxiliary switch Sas. The second comparator 52 is used for detecting a turning-on timing of the main switch Sm.

A first input terminal $51a$ of the first comparator 51 receives an external side voltage of the main switch Sm through the connection node 11. The first comparator 51 compares the received external side voltage of the main switch Sm with a first threshold voltage Vth1. A first reference terminal $51b$ of the first comparator 51 receives this first threshold voltage Vth1. When the received external side voltage of the main switch Sm becomes not less than the first threshold voltage Vth1, the first comparator 51 outputs an output signal of a high level.

On the other hand, when the received external side voltage of the main switch Sm is less than the first threshold voltage Vth1, the first comparator 51 outputs an output signal of a low level.

Similarly, a second input terminal $52a$ of the second comparator 52 receives an external side voltage of the main switch Sm through the connection node 11. The second comparator 52 compares the received external side voltage of the main switch Sm with a second threshold voltage Vth2. A second reference terminal $52b$ of the second comparator 52 receives this second threshold voltage Vth2. When the received external side voltage of the main switch Sm becomes not less than the second threshold voltage Vth2, the second comparator 52 outputs an output signal of a high level. On the other hand, when the received external side voltage of the main switch Sm is less than the second threshold voltage Vth2, the second comparator 52 outputs an output signal of a low level. The first threshold voltage Vth1 is lower than the input voltage Vi, and the second threshold voltage Vth2 is higher than the first threshold voltage Vth1, and lower than the input voltage Vi.

The main switch Sm, the output circuit part 2 and the auxiliary circuit 3 are connected to the control circuit part 4. The control circuit part 4 generates and transmits pulse control signals to the semiconductor switches in the power conversion device 1 so as to perform the control of operation of each of the semiconductor switches. The control circuit part 4 receives the output signal transmitted from the voltage detection part 5, and generates the pulse control signals on the basis of the received output signal so as to adjust the turning on/off timing of each of the semiconductor switches.

That is, when the main switch Sm is turned off, the control circuit part 4 turns off the auxiliary switch Sas before the voltage at the connection node 11 reaches the input voltage Vi under a situation in which the main switch Sm is in a turned off state, where this voltage at the connection node 11 increases when the auxiliary switch Sas is turned on. Specifically, when the external side voltage of the main switch Sm becomes not less than the first threshold voltage Vth1, the auxiliary switch Sas is turned off. Further, when the external side voltage of the main switch Sm becomes not less than the second threshold voltage Vth2, the main switch Sm is turned on. This control operation makes it possible to reduce the conductive loss of the auxiliary circuit 3, the diode loss, and the switching loss, and further to reduce the switching loss of the main switch Sm. The control operation will be explained later in detail.

The output circuit part 2 is configured to be an inverter to convert the direct current power of the battery B to an alternating current power. The output circuit part 2 has a plurality of half bridge circuits, connected in parallel from each other, between the main switch Sm and the negative electrode Bn of the battery B. In the structure of the power conversion device 1 according to the first exemplary embodiment, the three half bridge circuits 2u, 2v and 2w are arranged between the positive electrode side voltage potential line 1p connected to the positive electrode Bp of the battery B and the negative electrode side voltage potential line 1n connected to the negative electrode Bn of the battery B. For example, the negative electrode side voltage potential line 1n is connected to a ground voltage potential, i.e. is grounded.

Each of the half bridge circuits 2u, 2v and 2w is composed of an upper side arm switch at the positive electrode Bp side, and a lower side arm switch at the negative electrode Bn side. The upper side arm switch at the positive electrode Bp side is composed of the semiconductor switches Sup, Svp and Swp. The lower side arm switch at the negative electrode Bn side is composed of the semiconductor switches Sun, Svn and Swn. The upper side arm switch at the positive electrode Bp side and the lower side arm switch at the negative electrode Bn side are connected in series.

The other terminal of the motor coil Lu (i.e. which is opposite to the common terminal) is connected to a connection node 21u between the semiconductor switch Sup and the semiconductor switch Sun in the U phase. Similarly, the other terminal of the motor coil Lv is connected to a connection node 21v between the semiconductor switch Svp and the semiconductor switch Svn in the V phase, and the other terminal of the motor coil Lw is connected to a connection node 21w between the semiconductor switch Swp and the semiconductor switch Swn in the W phase.

The auxiliary circuit 3 has the series connection part and the auxiliary diode Das. In the series connection part, the auxiliary switch Sas and the resonance reactor L1 are connected in series. The auxiliary diode Das is connected to a connection node 31 between the auxiliary switch Sas and the resonance reactor L1.

The series connection part composed of the auxiliary switch Sas and the resonance reactor L1 is connected to the positive electrode side voltage potential line 1p, in parallel to the main switch Sm. Specifically, one terminal of the auxiliary switch Sas is connected to the positive electrode Bp side of the main switch Sm, and the one terminal of the resonance reactor L1 is connected to the output circuit part 2 side of the main switch Sm.

The auxiliary diode Das is connected in a reverse direction to a node between the connection node 31 and the negative electrode side voltage potential line 1n. In more detail, the cathode side of the auxiliary diode Das is connected to the connection node 31 between the auxiliary switch Sas and the resonance reactor L1, and the anode side of the auxiliary diode Das is connected to the negative electrode side voltage potential line 1n in order to rectify a reactor current Ias which is flowing during the operation of the auxiliary circuit 3.

It is possible to use a metal oxide semiconductor field effect transistor (MOS FET) of a gate voltage control type as the auxiliary switch Sas. Each of the main switch Sm and the auxiliary switch Sas has a diode which is connected in reverse direction between the drain and the source of the MOS FET. It is also acceptable to use, as the auxiliary switch Sas, a semiconductor switch, for example, a bipolar transistor, an insulated gate bipolar transistor (IGBT), etc.

Similarly, it is possible to use a MOS FET, as each of the semiconductor switches Sup, Svp, Swp, Sun, Svn and Swn which form the output circuit part 2. Further, the semiconductor switches Sup, Svp, Swp, Sun, Svn and Swn have diodes Dup, Dvp, Dwp, Dun, Dvn and Dwn, respectively, connected in reverse direction between the drain and source of each MOS FET. It is also acceptable to use, as each semiconductor switch, for example, a bipolar transistor, an IGBT, etc.

As previously described, each series connection part forming each half bridge circuit 2u, 2v, 2w is composed of two semiconductor switches. However, the concept of the present invention is not limited by this structure. It is also acceptable for each series connection part to have a combination of a semiconductor switch and a diode so long as each series connection part is composed of two semiconductor power elements.

Further, as previously described, the output circuit part 2 has the three phase inverter using the three half bridge circuits 2u, 2v and 2w. However, the concept of the present invention is not limited by this structure. It is also acceptable to use a single phase inverter as the output circuit part 2, or to use to use not less than two half bridge circuits as the output circuit part 2.

The resonance capacitor C1 is arranged between the main switch Sm and the output circuit part 2, in parallel to the plurality of the half bridge circuits 2 of the output circuit part 2. Specifically, the positive electrode side voltage potential line 1p at the source terminal of the main switch Sm is connected to one terminal of the resonance capacitor C1, and the other terminal of the resonance capacitor C1 is connected to the negative electrode side voltage potential line 1n which is grounded. It is preferable for the resonance capacitor C1 to have a capacitance which is more than a total sum of parasite capacitances of the semiconductor switches Sup, Svp, Swp, Spn, Svn and Swn of the output circuit part 2. When the resonance capacitor C1 has a large capacitance and a low voltage dependence, it is possible to increase the switching characteristics of the semiconductor switches. Further, this makes it possible to smoothly increase a voltage between the drain and source of the main switch Sm, and to reduce a switching loss of the semiconductor switches at the turning-off operation thereof. Still further, it is possible to arrange the resonance capacitor C1 at an area close to the auxiliary circuit 3. This makes it possible to reduce a current loop, and to reduce radiation noise.

The power conversion device 1 according to the first exemplary embodiment has the smoothing capacitor Ci which is capable of smoothing the direct current voltage of the battery B. Specifically, the smoothing capacitor Ci is connected between the positive electrode side voltage potential line 1p and the negative electrode side voltage potential line 1n at the battery B side when viewed from a connection node 12 between the auxiliary switch Sas and the main switch Sm. This connection structure makes it possible to suppress influence due to the variation of the direct current power of the battery B.

The control circuit part 4 is connected to the gate electrode of each of the main switch Sm and the auxiliary switch Sas through its corresponding gate line. Further, the control circuit part 4 is connected to the gate electrode of each of the semiconductor switches Sup, Svp, Swp, Spn, Svn and Swn in the half bridge circuits 2u, 2v and 2w through its corresponding gate line For example, the control circuit part 4 generates and transmits pulse control signals to each of the gate electrodes of the semiconductor switches Sup, Svp, Swp, Spn, Svn and Swn in the half bridge circuits 2u, 2v and 2w so that the output torque of the alternating current motor M becomes a request torque thereof by turning on/off of the semiconductor switches Sup, Svp, Swp, Spn, Svn and Swn on the basis of the generated pulse control signals, and the direct current power of the battery B is converted to an alternating current power. At this time, the control circuit part 4 adjusts the three half bridge circuits 2u, 2v and 2w in the output circuit part 2 so that the semiconductor switches Sup, Svp, Swp in the upper side arm and the semiconductor switches Spn, Svn and Swn in the lower arm are alternately turned on/off, and phase currents Iu, Iv and Iw flow in the motor coils Lu, Lv and Lw, respectively.

Figure 2:
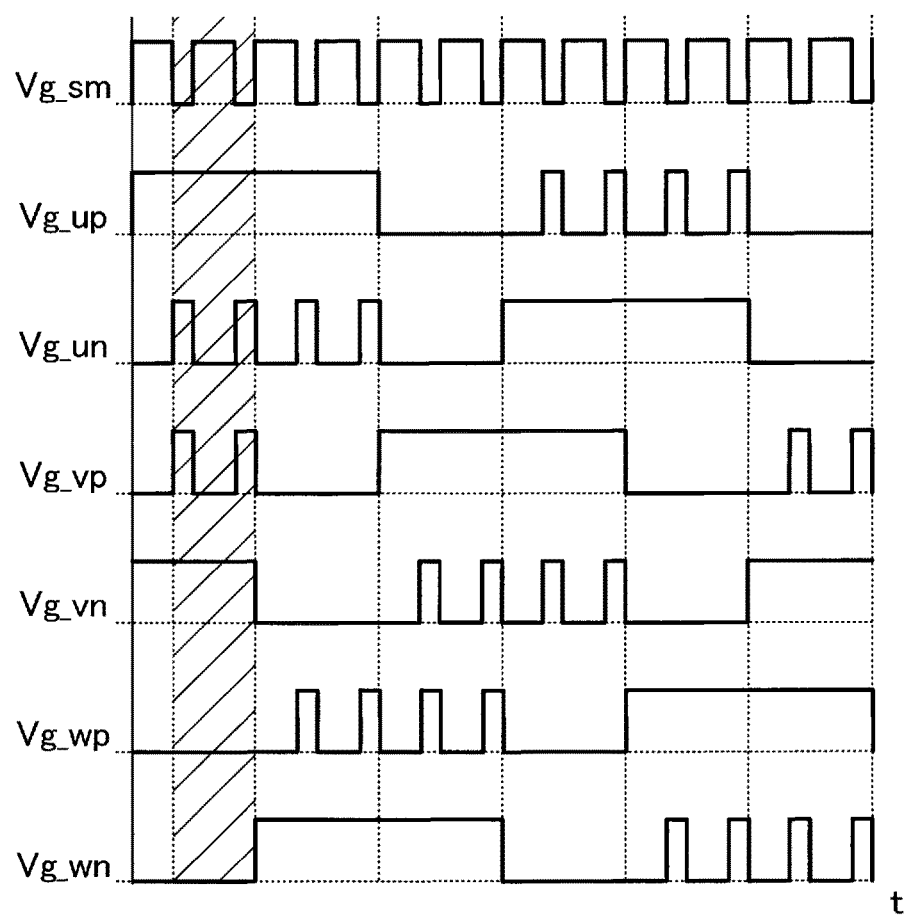
FIG. 2 is a view showing a waveform of a main switch and wave forms of pulse control signals transmitted to semiconductor switches in three half bridge circuits 2u, 2v and 2w in an output circuit part 2 in the power conversion device 1 according to the first exemplary embodiment.

FIG. 2 is a view showing a waveform of the main switch Sm and wave forms of the pulse control signals transmitted to the semiconductor switches Sup, Svp, Swp, Spn, Svn and Swn in the three half bridge circuits in the output circuit part 2 in the power conversion device 1 according to the first exemplary embodiment.

As shown in FIG. 2, the control circuit part 4 transmits the pulse control signals at different timings to the gate electrode of each of the semiconductor switches Sup, Svp, Swp, Spn, Svn and Swn in the half bridge circuits 2u, 2v and 2w in the output circuit part 2. The semiconductor switches Sup, Svp, Swp, Spn, Svn and Swn in the half bridge circuits 2u, 2v and 2w corresponds to three phases, i.e. U phase, V phase and W phase of the alternating current motor M.

The three phases are shifted from each other by 120 electrical degrees, and one cycle of each of the three phases U, V and W is 360 degrees. FIG. 2 shows the electrical angle of 120 degrees. The concept of the present invention is not limited by this electrical angle of 120 degrees. It is possible to use another electrical angle.

In the three half bridge circuits 2u, 2v and 2w, the conductive state of the semiconductor switches Sup, Svp and Swp as the upper arm switch is adjusted by using a combination of the turned on/off state of the main switch Sm and the turned on/off state of each of the semiconductor switches Sup, Svp and Swp. That is, during a period of the electrical angle of 120 degrees in one cycle, the semiconductor switches Sup, Svp and Swp are turned on, and the main switch Sm is turned on/off. During the turned on state of the main switch Sm, the semiconductor switches Sup, Svp and Swp are substantially turned on, i.e. in the conductive state.

It is controlled that the semiconductor switches Sun, Svn and Swn as the lower arm switch are turned on when the semiconductor switches Sup, Svp and Swp as the upper arm switch are substantially turned off. In other words, the control circuit part 4 prohibits the semiconductor switches Sun, Svn and Swn as the lower arm switch from being turned on when both the main switch Sm is turned on and the semiconductor switches Sup, Svp and Swp are turned on.

The main switch Sm is driven on the basis of a pulse width modulation (PWM) control. During the turned-on state of the main switch Sm, the control circuit part 4 generates a current path through the semiconductor switches Sup, Svp and Swp of one phase in the turned-on state in the three phases U, V and W. For example, the control circuit part 4 calculates a duty ratio of the PWM control on the basis of a difference between a target value and a detected value of each phase voltage or an each phase current, and generates PWM signals as the pulse control signals previously explained. The duty ratio is a ratio of a turned-on period and a turned-off period in one period of a pulse wave, i.e. a switching period. The main switch Sm is turned on/off at a predetermined timing on the basis of the PWM signal.

The reference character Vg_sm shown in FIG. 2 represents a gate voltage of the main switch Sm. When the gate voltage is a high level (H level), the main switch Sm is turned on. When the gate voltage is a low level (L level), the main switch Sm is turned off.

Similarly, the reference character Vg_up shown in FIG. 2 represents a gate voltage of the semiconductor switch Sup in the upper arm switch in the U phase. The reference character Vg_un shown in FIG. 2 represents a gate voltage of the semiconductor switch Sun in the lower arm switch in the U phase.

The reference character Vg_vp shown in FIG. 2 represents a gate voltage of the semiconductor switch Svp in the upper arm switch in the V phase. The reference character Vg_vn shown in FIG. 2 represents a gate voltage of the semiconductor switch Svn in the lower arm switch in the V phase.

Further, the reference character Vg_wp shown in FIG. 2 represents a gate voltage of the semiconductor switch Swp in the upper arm switch in the W phase. The reference character Vg_wn shown in FIG. 2 represents a gate voltage of the semiconductor switch Swn in the lower arm switch in the W phase.

During the turned-on state of the semiconductor switches Sup, Svp and Swp, the turning on/off switching operation of the main switch Sm is performed four times. The number of the turning on/off switching operation of the main switch Sm is changed due to circuit conditions, etc.

As previously described, the output circuit part 2 having the three half bridge circuits 2u, 2v and 2w is assembled with the main switch Sm in the structure of the power conversion device 1 according to the first exemplary embodiment. This structure makes it possible to drastically increase the controllability of the output circuit part 2 composed of the three half bridge circuits 2u, 2v and 2w. In other words, this structure allows the control circuit part 4 to easily perform the control of the turning on/off switching of the semiconductor switches Sup, Svp, Swp, Spn, Svn and Swn in the half bridge circuits 2u, 2v and 2w of the output circuit part 2.

Further, this structure makes it possible to easily perform the turning on/off switching operation of the semiconductor switches Sup, Svp, Swp, Spn, Svn and Swn in the half bridge circuits 2u, 2v and 2w on the basis of the zero-voltage switching, i.e. ZVS by using the LC resonance circuit when the main switch Sm is turned on/off, where, the LC resonance circuit is composed of the resonance capacitor C1 and the auxiliary circuit 3 having the resonance reactor L1.

A description will now be given of the control operation of the control circuit part 4 in the switching periods T1 to T8 with reference to FIG. 3A and FIG. 3B when an alternating current power is supplied to the U phase of the alternating current motor M. The switching periods T1 to T8 correspond to one period of operation of the main switch Sm, which is also designated by slanting lines shown in FIG. 2. The smoothing capacitor C1 is omitted from FIG. 3A, FIG. 4A, FIG. 5A, FIG. 6A and FIG. 7A for brevity.

Figure 3A:
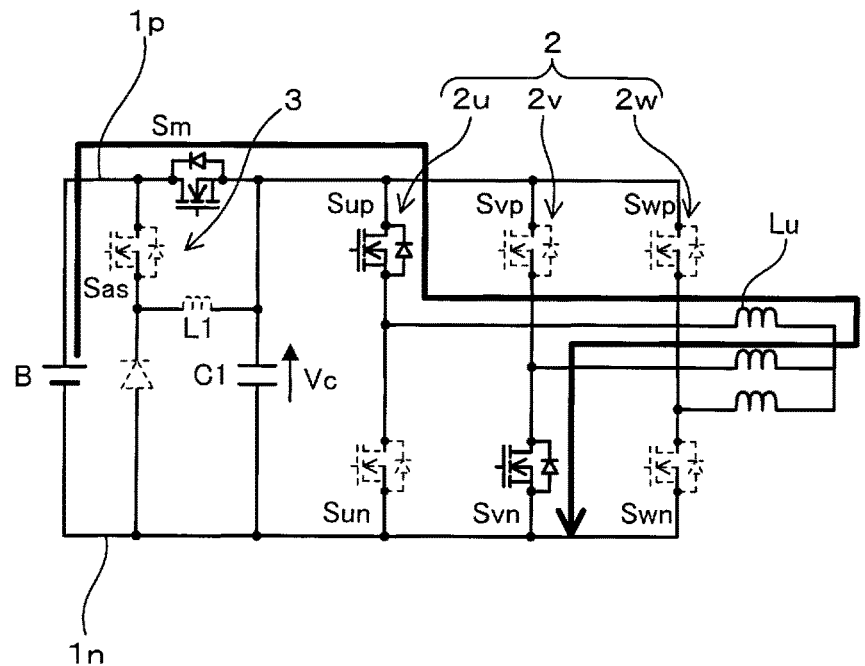
FIG. 3A is a view showing a current path during a switching period T1 of the main switch Sm in the power conversion device 1 according to the first exemplary embodiment.

FIG. 3A is a view showing a current path during the switching period T1 of the main switch Ms in the power conversion device 1 according to the first exemplary embodiment. FIG. 3B is a timing chart showing operation states of the main switch Sm and the semiconductor switches in the half bridge circuits 2u, 2v and 2w during the switching periods T1 to T8, in particular the switching period T1 of the main switch Sm in the power conversion device 1 according to the first exemplary embodiment.

As shown in FIG. 3A, when the power is supplied to the motor coil Lu in the U phase of the alternating current motor M, the control circuit part 4 transmits gate voltage instruction signals of a high level to the main switch Sm, the semiconductor switch Sup in the half bridge circuit 2u and the semiconductor switch Svn in the half bridge circuit 2v so as to turn on the main switch Sm and the semiconductor switches Sup, Svn. The remaining semiconductor switches Sun and Svp in the half bridge circuits 2u and 2v, and the semiconductor switches Swp and Swn in the half bridge circuit 2w are turned off.

Figure 3B:
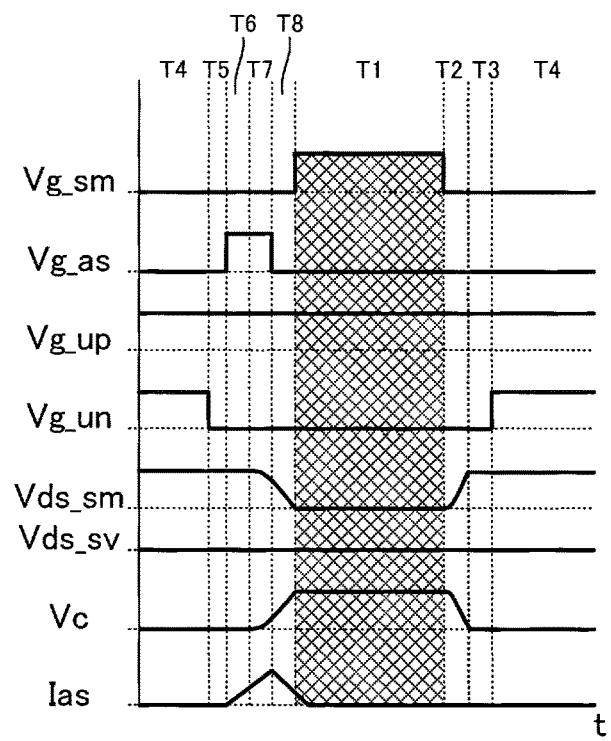
FIG. 3B is a timing chart showing operation states of the main switch Sm and the semiconductor switches in the half bridge circuits 2u, 2v and 2w during the switching periods T1 to T8, in particular the switching period T1 of the main switch Sm in the power conversion device 1 according to the first exemplary embodiment.

In this case, during the period T1 shown in FIG. 3B in which the main switch Sm is turned on, a current path (which is designated by the arrow line shown in FIG. 3A) is generated from the negative electrode side voltage potential line 1n of the battery B to the negative electrode side voltage potential line 1n of the battery B through the main switch Sm, the semiconductor switches Sup, the motor coil Lu and the semiconductor switches Svn. Because the drain and the source of the main switch Sm are connected together, i.e. allow conduction therebetween, the drain-source voltage Vds_sm is 0 V. Reference character Vg_as shown in FIG. 3B represents a gate voltage of the auxiliary switch Sas.

Prior to the period T1, as will be explained later, the auxiliary switch Sas in the auxiliary circuit 3 was driven during the switching periods T4 to T8 in a previous cycle, and the resonance capacitor C1 has been charged. Accordingly, the capacitor voltage Vc becomes equal to the input voltage Vi (for example, 48 V), and this increases the voltage at the connection node 11 at the source side of the main switch Sm. At a rising time of the gate voltage of the main switch Sm, it is possible to perform the turning on operation of the main switch on the basis of the ZVS. Further, it is possible to suppress an excessive current from flowing in the auxiliary circuit 3 by turning off the auxiliary switch Sas before the turning-on operation of the main switch Sm.

Figure 4A:
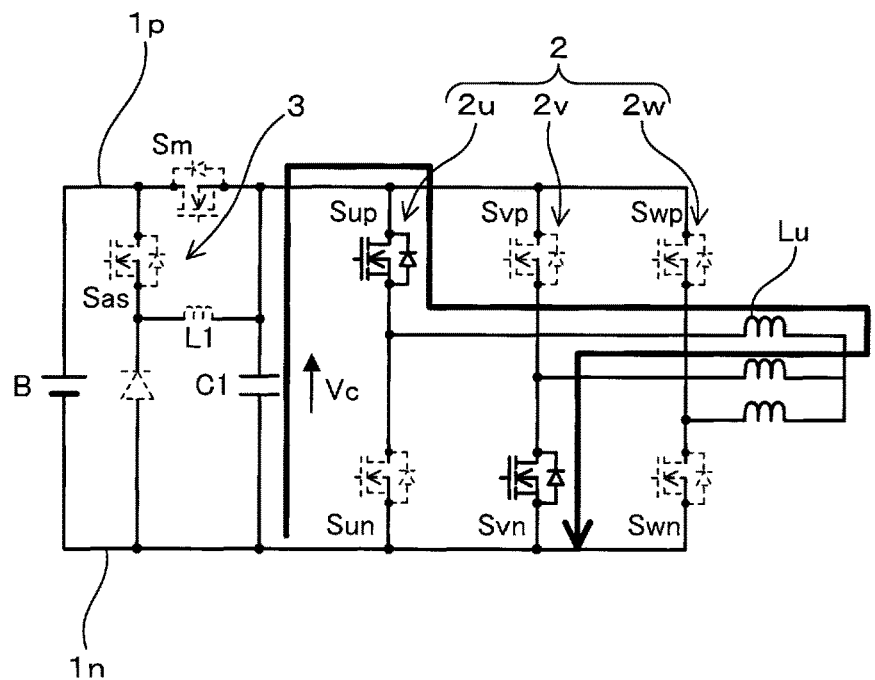
FIG. 4A is a view showing a current path during the switching period T2 of the main switch Sm in the power conversion device 1 according to the first exemplary embodiment.
Figure 4B:
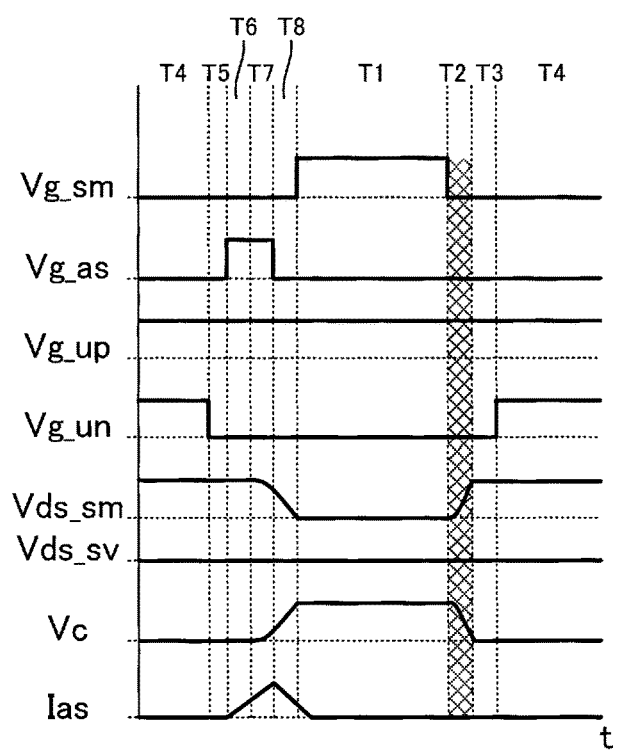
FIG. 4B is a timing chart showing the operation states of the main switch Sm and the semiconductor switches in the half bridge circuits 2u, 2v and 2w during the switching periods T1 to T8, in particular the switching period T2 of the main switch Sm in the power conversion device 1 according to the first exemplary embodiment.

FIG. 4A is a view showing a current path during the switching period T2 of the main switch Sm in the power conversion device 1 according to the first exemplary embodiment. FIG. 4B is a timing chart showing the operation states of the main switch Sm and the semiconductor switches in the half bridge circuits 2u, 2v and 2w during the switching periods T1 to T8, in particular the switching period T2 of the main switch Sm in the power conversion device 1 according to the first exemplary embodiment.

As shown in FIG. 4A, when the main switch Sm is turned off, the resonance capacitor C1 supplies electrical charges to the connection node 11 between the main switch Sm and the output circuit part 2. This generates a current path (which is designated by the arrow line shown in FIG. 4A) from the resonance capacitor C1 to the negative electrode side voltage potential line 1n through the semiconductor switches Sup, the motor coil Lu, the motor coil Lv and the semiconductor switches Svn.

Because the gate voltage Vg_sm of the main switch Sm is switched from the high level to the low level during the switching period T2 shown in FIG. 4B, the main switch Sm is turned off, and the capacitor voltage Vc of the resonance capacitor C1 is reduced by supply of the electrical charge from the resonance capacitor C1, and the drain-source voltage of the main switch Sm increases.

At this time, because a reduction speed of the capacitor voltage Vc of the resonance capacitor C1 is smaller than a switching speed of the main switch Sm, it is possible to turn off the main switch Sm before the drain-source voltage Vds_sm of the main switch Sm increases. That is, the turning-off operation of the main switch Sm is performed based on the ZVS when the gate voltage Vg_sm of the main switch Sm is rising during the switching period T2. After this, the capacitor voltage Vc is reduced to 0 V by the discharging of the electrical charges of the resonance capacitor C1, and the drain-source voltage Vds_sm of the main switch Sm becomes equal to the voltage of the battery B.

Figure 5A:
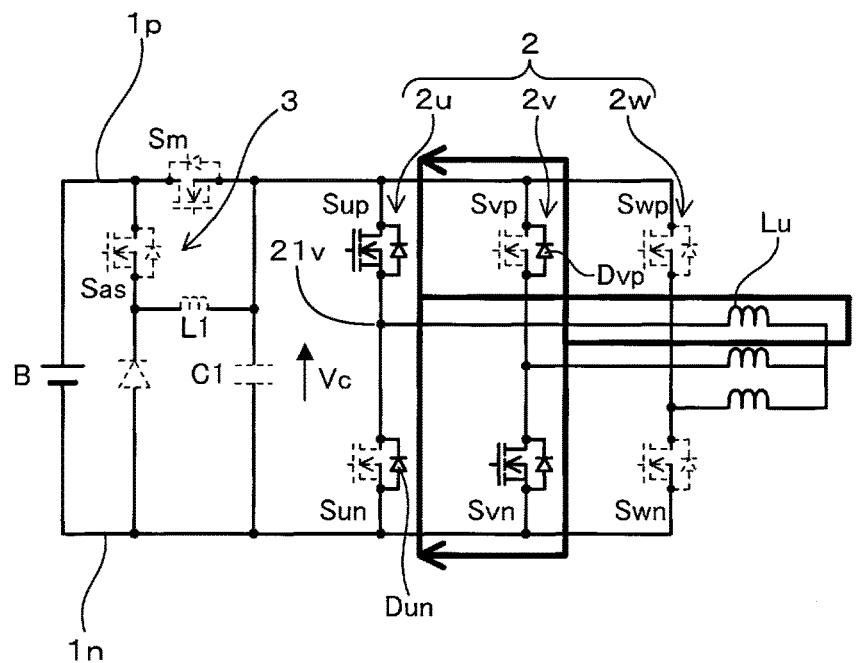
FIG. 5A is a view showing a current path during the switching period T3 of the main switch Sm in the power conversion device 1 according to the first exemplary embodiment.
Figure 5B:
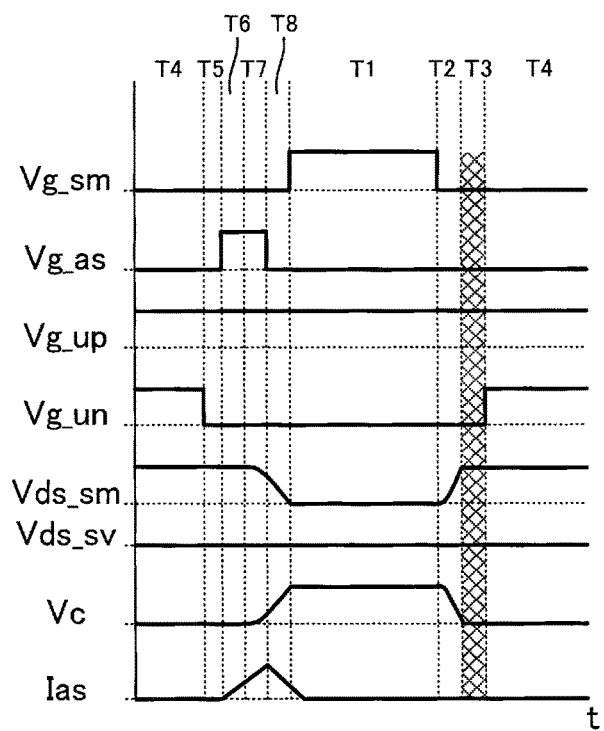
FIG. 5B is a timing chart showing the operation states of the main switch Sm and the semiconductor switches in the half bridge circuits 2u, 2v and 2w during the switching periods T1 to T8, in particular the switching period T3 of the main switch Sm in the power conversion device 1 according to the first exemplary embodiment.

FIG. 5A is a view showing a current path during the switching period T3 of the main switch Sm in the power conversion device 1 according to the first exemplary embodiment. FIG. 5B is a timing chart showing the operation states of the main switch Sm and the semiconductor switches in the half bridge circuits 2u, 2v and 2w during the switching periods T1 to T8, in particular the switching period T3 of the main switch Sm in the power conversion device 1 according to the first exemplary embodiment.

In the switching period T3 shown in FIG. 5B, a motor coil current, i.e. a reflux current is flowing from the alternating current motor M to the battery B. That is, as shown in FIG. 5A, the reflux current is flowing from the connection node 21v of the half bridge circuit 2v to the semiconductor switch Sup through the diode Dvp of the semiconductor switch Svp, and is also flowing from the semiconductor switch Svn to the semiconductor switch Sup through the diode Dun of the semiconductor switch Sun.

Figure 6A:
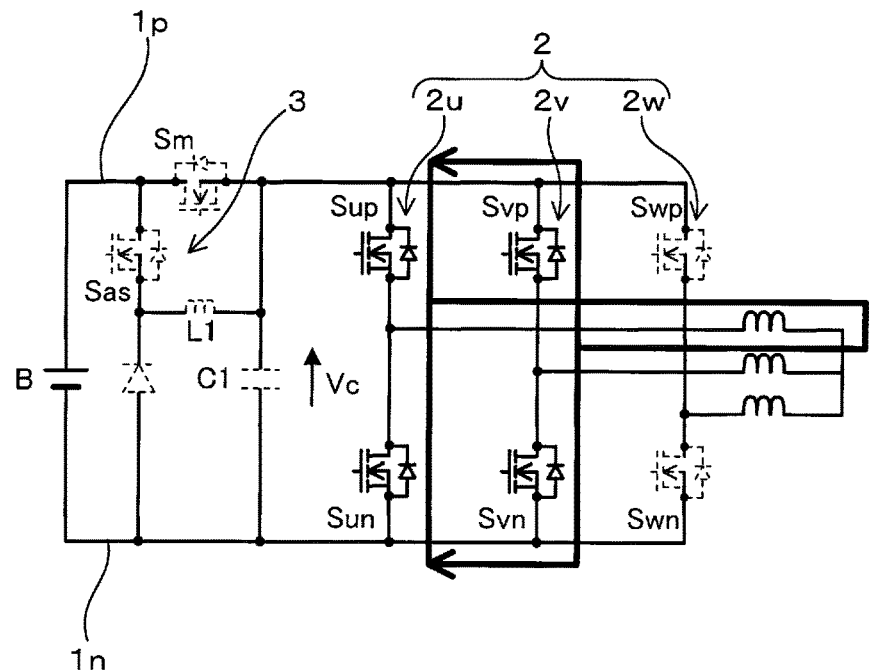
FIG. 6A is a view showing a current path during the switching period T4 of the main switch Sm in the power conversion device 1 according to the first exemplary embodiment.
Figure 6B:
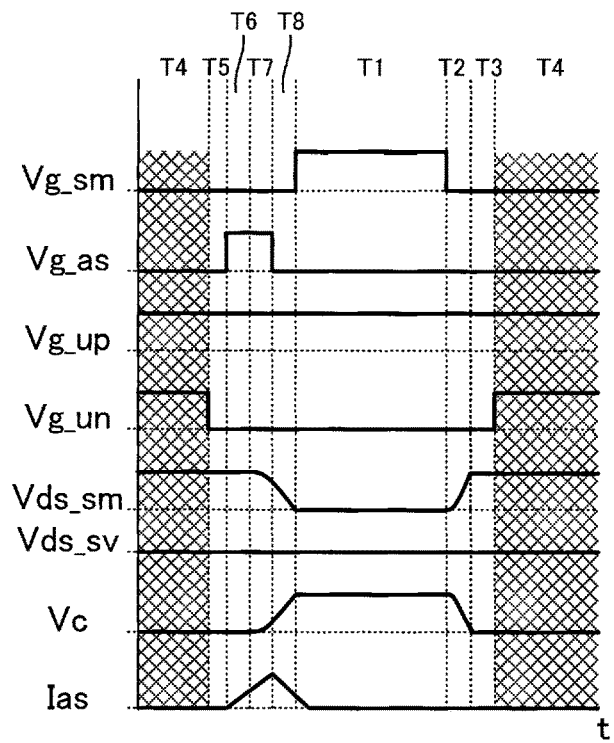
FIG. 6B is a timing chart showing the operation states of the main switch Sm and the semiconductor switches in the half bridge circuits 2u, 2v and 2w during the switching periods T1 to T8, in particular the switching period T4 of the main switch Sm in the power conversion device 1 according to the first exemplary embodiment.

FIG. 6A is a view showing a current path during the switching period T4 of the main switch Sm in the power conversion device 1 according to the first exemplary embodiment. FIG. 6B is a timing chart showing the operation states of the main switch Sm and the semiconductor switches in the half bridge circuits 2u, 2v and 2w during the switching periods T1 to T8, in particular the switching period T4 of the main switch Sm in the power conversion device 1 according to the first exemplary embodiment.

During the switching period T4 shown in FIG. 6B, the semiconductor switch Sun and the semiconductor switch Svp are turned on. In this case, because the semiconductor switch Sun having a smaller conductive loss is connected to the drain-source of the semiconductor switch Svp, this makes it possible to reduce the conductive loss. In addition, because the connection node between the semiconductor switch Sun and the semiconductor switch Svp has the same voltage potential, the turning-on operation of the semiconductor switch Sun and the semiconductor switch Svp are performed based on the ZVS.

Figure 7A:
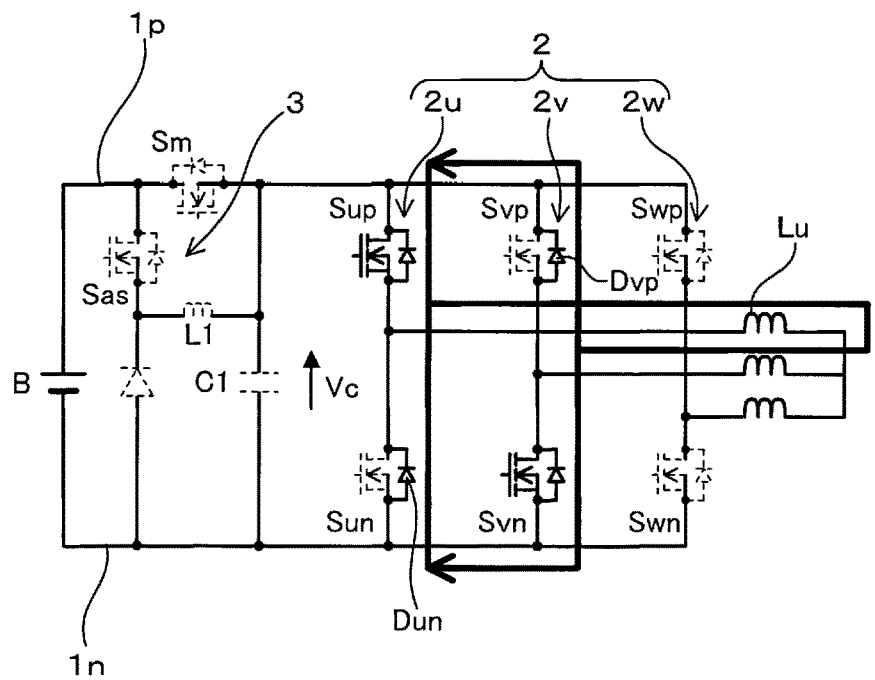
FIG. 7A is a view showing a current path during the switching period T5 of the main switch Sm in the power conversion device 1 according to the first exemplary embodiment.
Figure 7B:
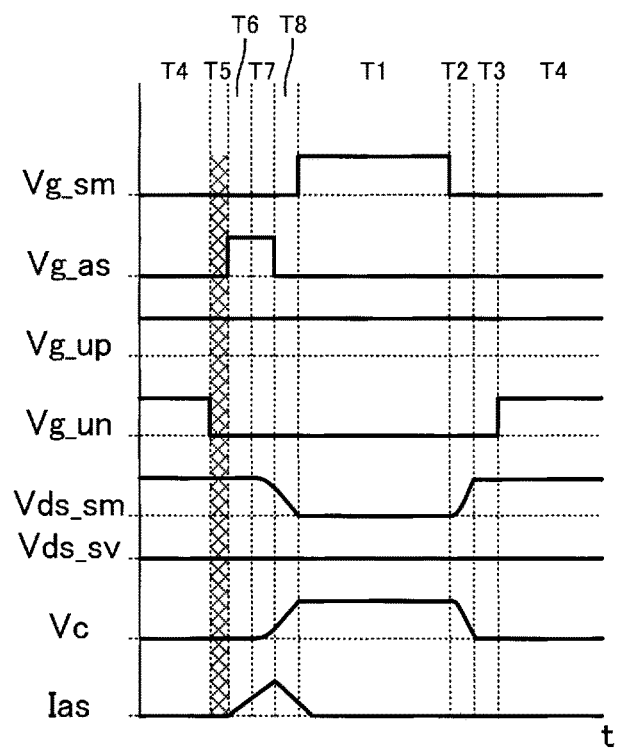
FIG. 7B is a timing chart showing the operation states of the main switch Sm and the semiconductor switches in the half bridge circuits 2u, 2v and 2w during the switching periods T1 to T8, in particular the switching period T5 of the main switch Sm in the power conversion device 1 according to the first exemplary embodiment.

FIG. 7A is a view showing a current path during the switching period T5 of the main switch Sm in the power conversion device 1 according to the first exemplary embodiment. FIG. 7B is a timing chart showing the operation states of the main switch Sm and the semiconductor switches in the half bridge circuits 2u, 2v and 2w during the switching periods T1 to T8, in particular the switching period T5 of the main switch Sm in the power conversion device 1 according to the first exemplary embodiment Still further, during the switching period T5 shown in FIG. 7B, the semiconductor switch Sun and the semiconductor switch Svp are turned off. Because the drain-source voltage of the semiconductor switch Sun and the drain-source voltage of the semiconductor switch Svp are the same voltage potential, the main switch Sm is turned off based on the ZVS.

Figure 8:
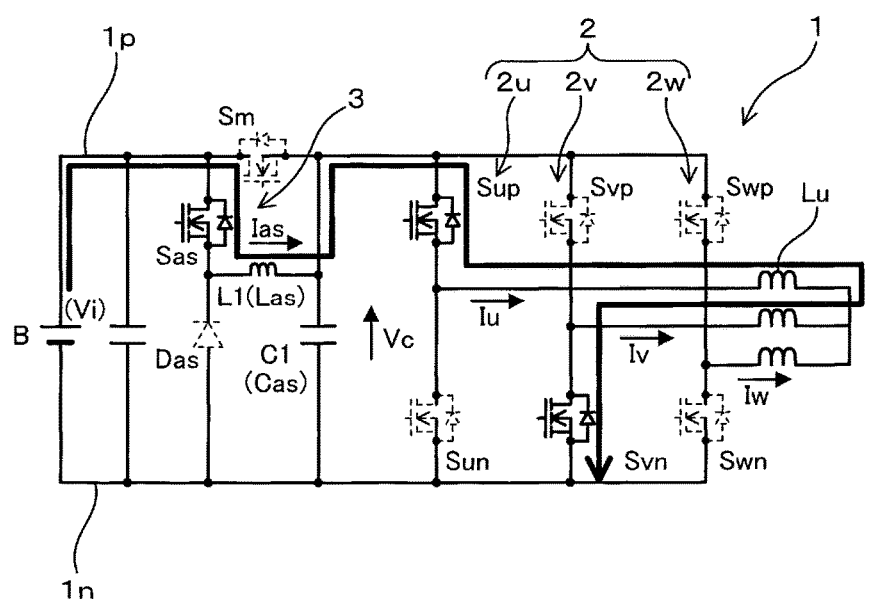
FIG. 8 is a view showing a current path during the switching period T6 of the main switch Sm in the power conversion device 1 according to the first exemplary embodiment.
Figure 9:
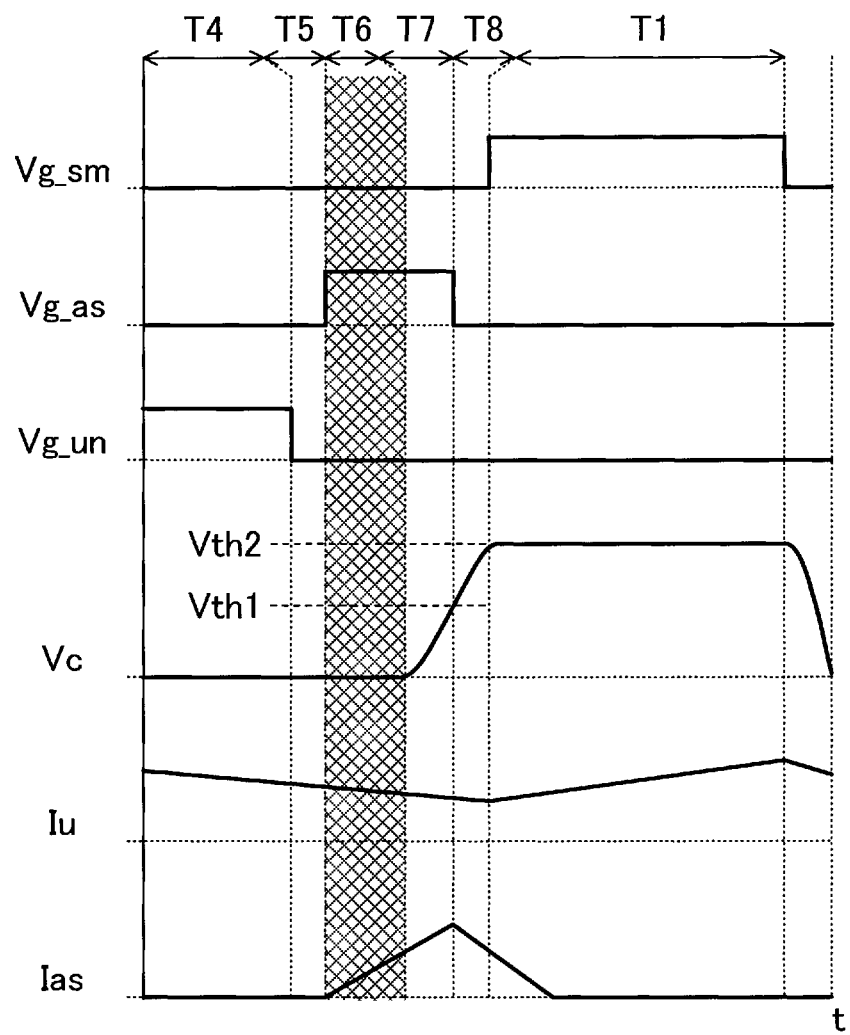
FIG. 9 is a timing chart showing the operation states of the main switch Sm and the semiconductor switches in the half bridge circuits 2u, 2v and 2w during the switching periods T1 to T8, in particular the switching period T6 of the main switch Sm in the power conversion device 1 according to the first exemplary embodiment.

FIG. 8 is a view showing a current path during the switching period T6 of the main switch Sm in the power conversion device 1 according to the first exemplary embodiment. FIG. 9 is a timing chart showing the operation states of the main switch Sm and the semiconductor switches in the half bridge circuits 2u, 2v and 2w during the switching periods T1 to T8, in particular the switching period T6 of the main switch Sm in the power conversion device 1 according to the first exemplary embodiment.

During the switching periods T6 to T8 of the main switch Sm shown in FIG. 8 to FIG. 13, the auxiliary circuit 3 operates to charge the resonance capacitor C1.

A description will now be given of the control operation of the control circuit part 4 with reference to FIG. 14.

Figure 14:
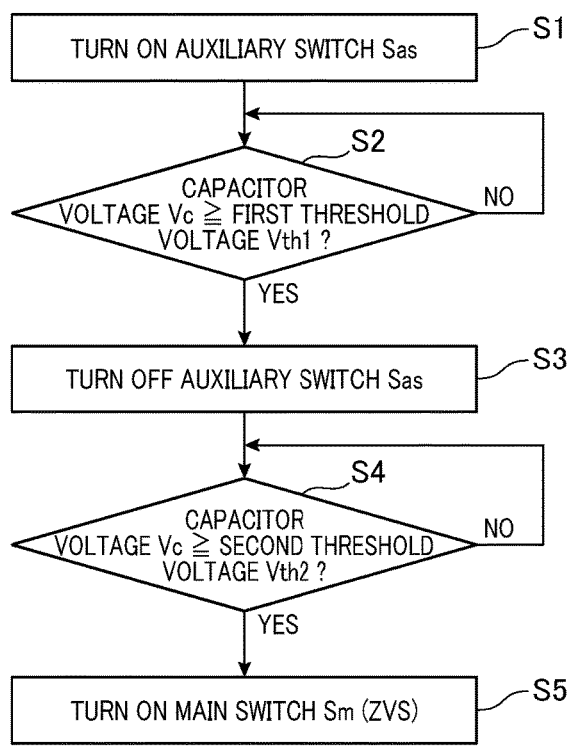
FIG. 14 is a view showing a flow chart of a switching control performed by the control circuit part 4 in the power conversion device 1 according to the first exemplary embodiment.

FIG. 14 is a view showing a flow chart of a switching control performed by the control circuit part 4 in the power conversion device 1 according to the first exemplary embodiment.

In step S1 shown in FIG. 14, when the control circuit part 4 transmits the gate voltage instruction signal to the control circuit part 4, the auxiliary switch Sas is turned on, as shown in FIG. 8, and the current is flowing from the resonance reactor L1 to the negative electrode side voltage potential line 1n through the semiconductor switch Sup, the motor coil Lu, the motor coil Lv and the semiconductor switch Svn.

As shown in FIG. 9, because no power is supplied to the auxiliary circuit 3 before the switching period T6, and the resonance reactor L1 suppresses the current from rising, the turning-on operation of the auxiliary switch Sas is performed based on zero current switching (i.e. ZCS) operation.

In accompaniment with the turning-on operation of the auxiliary switch Sas, the reactor current Ias is flowing in the auxiliary circuit 3 through the auxiliary switch Sas and the resonance reactor L1. During the switching period T6, the reactor current Ias increases with the elapse of time. The phase current Iu is gradually reduced during the switching period T4 to the switching period T8.

Figure 10:
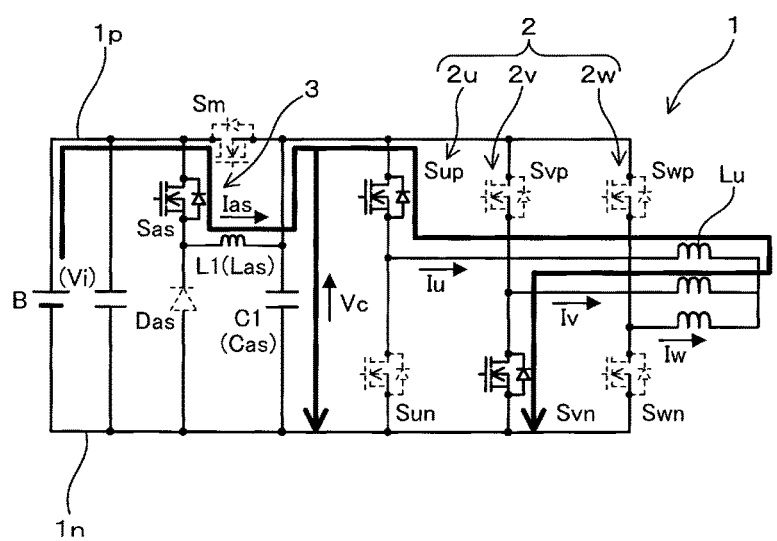
FIG. 10 is a view showing a current path during the switching period T7 of the main switch Sm in the power conversion device 1 according to the first exemplary embodiment.
Figure 11:
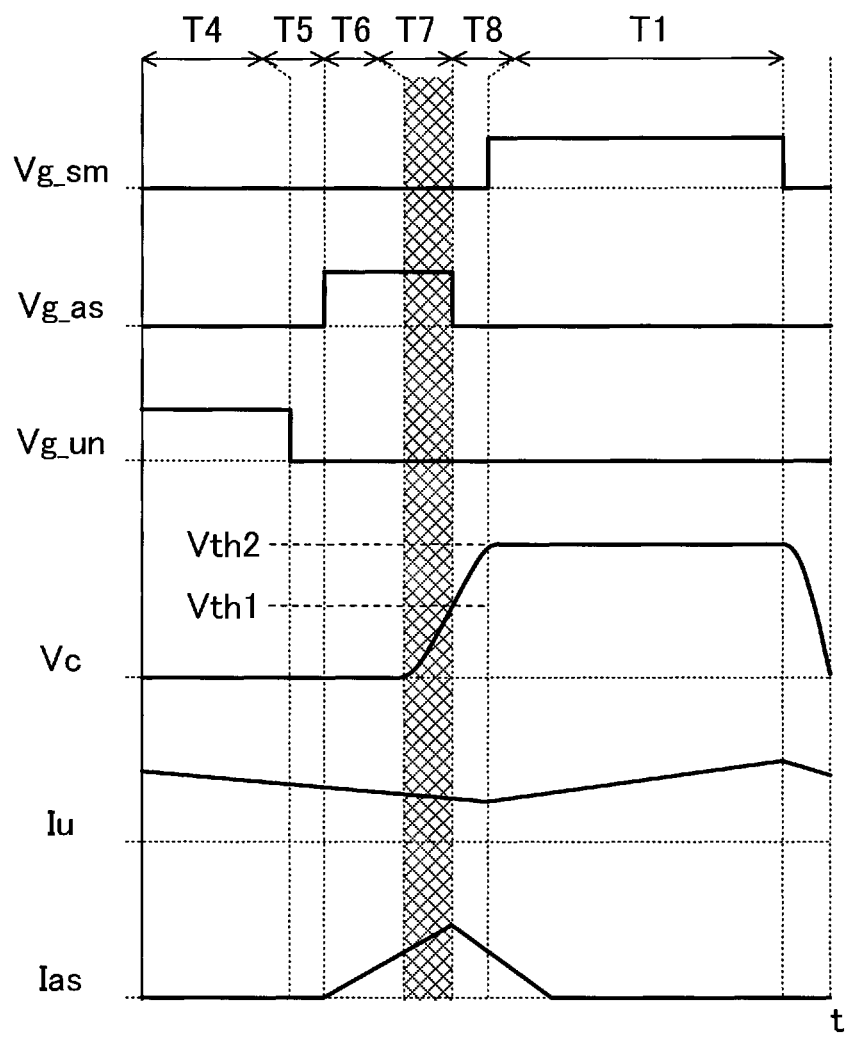
FIG. 11 is a timing chart showing the operation states of the main switch Sm and the semiconductor switches in the half bridge circuits 2u, 2v and 2w during the switching periods T1 to T8, in particular the switching period T7 of the main switch Sm in the power conversion device 1 according to the first exemplary embodiment.

FIG. 10 is a view showing a current path during the switching period T7 of the main switch Sm in the power conversion device 1 according to the first exemplary embodiment. FIG. 11 is a timing chart showing the operation states of the main switch Sm and the semiconductor switches in the half bridge circuits 2u, 2v and 2w during the switching periods T1 to T8, in particular the switching period T7 of the main switch Sm in the power conversion device 1 according to the first exemplary embodiment.

As shown in FIG. 10 and FIG. 11, when the reactor current Ias is not less than the phase current Iu during the switching period T7, the charge current flows to the resonance capacitor C1, and the capacitor voltage Vc starts to increase. At the same time, the drain-source voltage Vds_sm of the main switch Sm is reduced. (For example, see the switching period T7 shown in FIG. 3B, FIG. 4B, FIG. 5B, FIG. 6B and FIG. 7B).

In step S2 shown in FIG. 14, the control circuit part 4 receives the output signal transmitted from the first comparator 51 in the voltage detection part 5, and detects whether the capacitor voltage Vc reaches to the first threshold voltage Vth1.

When the detection result in step S2 indicates that the capacitor voltage Vc has reached the first threshold voltage Vth1, the operation flow progresses to step S3.

On the other hand, when the detection result in step S2 indicates that the capacitor voltage Vc does not reach the first threshold voltage Vth1, the process in step S2 is repeated until the capacitor voltage Vc reaches the first threshold voltage Vth1.

Figure 12:
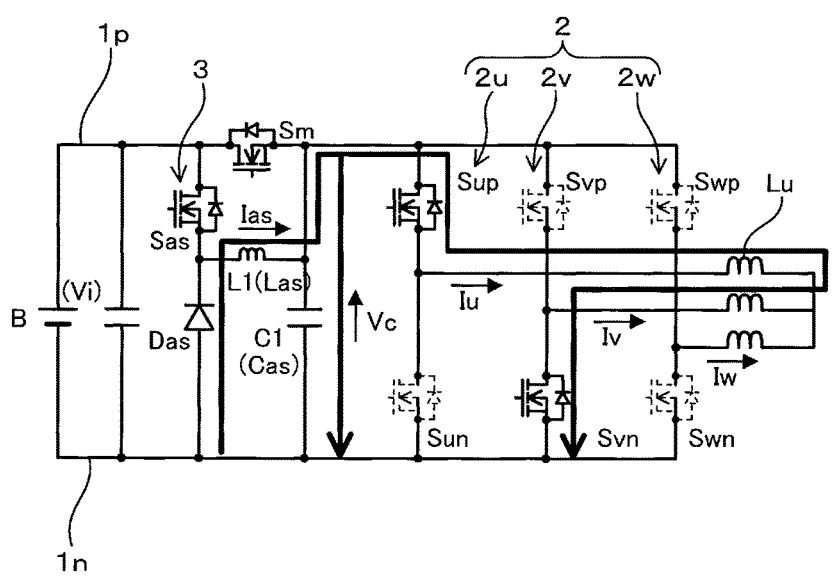
FIG. 12 is a view showing a current path during the switching period T8 of the main switch Sm in the power conversion device 1 according to the first exemplary embodiment.

FIG. 12 is a view showing a current path during the switching period T8 of the main switch Sm in the power conversion device 1 according to the first exemplary embodiment.

In step S3 shown in FIG. 14, the control circuit part 4 transmits the gate voltage instruction signal to the auxiliary switch Sas. When receiving the gate voltage instruction signal, the auxiliary switch Sas is turned off as shown in FIG. 12, and the resonance reactor L1 and the resonance capacitor C1 resonate with each other, and the energy charged in the resonance reactor L1 is supplied to the resonance capacitor C1.

Figure 13:
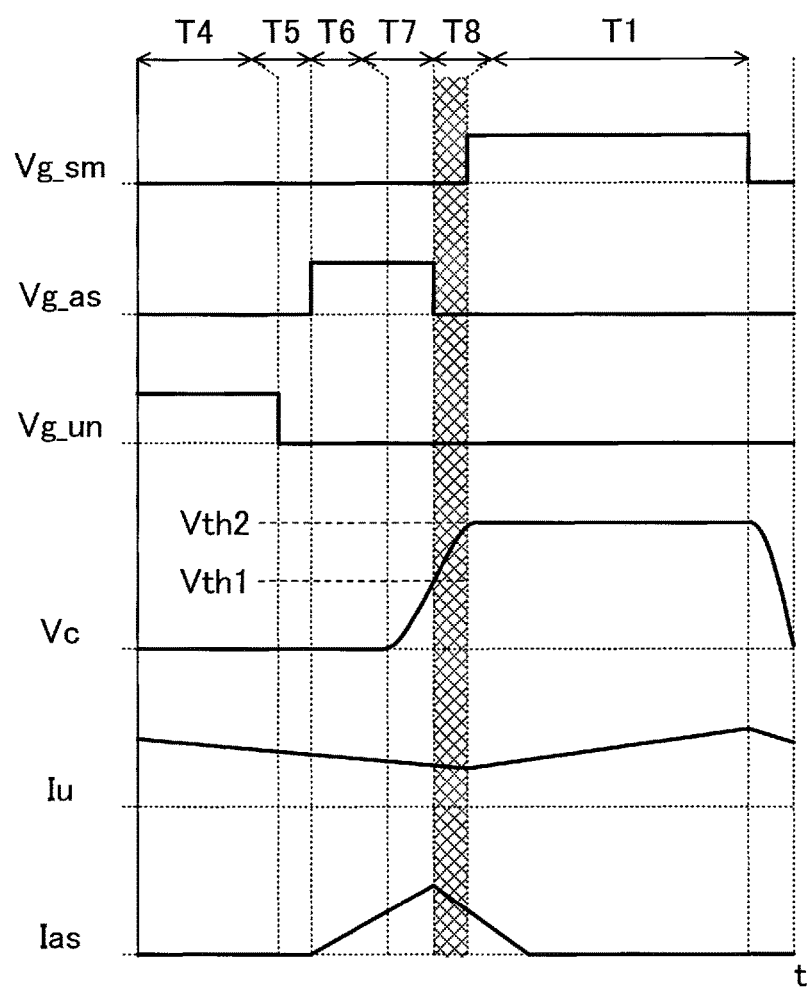
FIG. 13 is a timing chart showing the operation states of the main switch Sm and the semiconductor switches in the half bridge circuits 2u, 2v and 2w during the switching periods T1 to T8, in particular the switching period T8 of the main switch Sm in the power conversion device 1 according to the first exemplary embodiment.

FIG. 13 is a timing chart showing the operation states of the main switch Sm and the semiconductor switches in the half bridge circuits 2u, 2v and 2w during the switching periods T1 to T8, in particular the switching period T8 of the main switch Sm in the power conversion device 1 according to the first exemplary embodiment.

During the switching period T8 shown in FIG. 13, the capacitor voltage Vc of the resonance capacitor C1 continuously increases, In step S4 shown in FIG. 14, the control circuit part 4 receives the comparison result transmitted from the second comparator 52 in the voltage detection part 5, and detects whether the capacitor voltage Vc reaches the second threshold voltage Vth2.

When the detection result in step S4 indicates that the capacitor voltage Vc has reached the second threshold voltage Vth2, the operation flow progresses to step S5.

On the other hand, when the detection result in step S4 indicates that the capacitor voltage Vc has not reached the second threshold voltage Vth2, the control circuit part 4 performs the process in step S4 repeatedly until the capacitor voltage Vc reaches the second threshold voltage Vth2. When a hard switching operation for the main switch Sm is permitted, it is acceptable to progress to step S5 even if the detection result in step S4 indicates that the capacitor voltage Vc does not reach the second threshold voltage Vth2.

For example, it is possible to use, as the first threshold voltage Vth1, a half of the input voltage Vi, and possible to use the input voltage Vi as the second threshold voltage Vth2. In this case, during the switching periods T6 to T8, it is possible to increase the capacitor voltage Vc to the input voltage Vi. At the same time, the drain-source voltage Vds_sm of the main switch Sm of the main switch Sm is reduced to 0 V by increasing the voltage potential at the source terminal of the mains witch Sm during the switching period T8 shown in FIG. 3B, FIG. 4B, FIG. 5B, FIG. 6B and FIG. 7B). The reactor current Ias is gradually reduced in accompaniment with the turned-on operation of the auxiliary switch Sas.

In step S5 shown in FIG. 14, when the control circuit part 4 transmits the gate voltage instruction signal to the main switch Sm so as to turn on the main switch Sm, the operation of one switching period is finished, and a following switching period is started. The control circuit part 4 repeatedly performs the processes in step S1 to step S5 shown in FIG. 14, and performs the switching operation to turn the main switch Sm on/off based on the ZVS.

Figure 15:
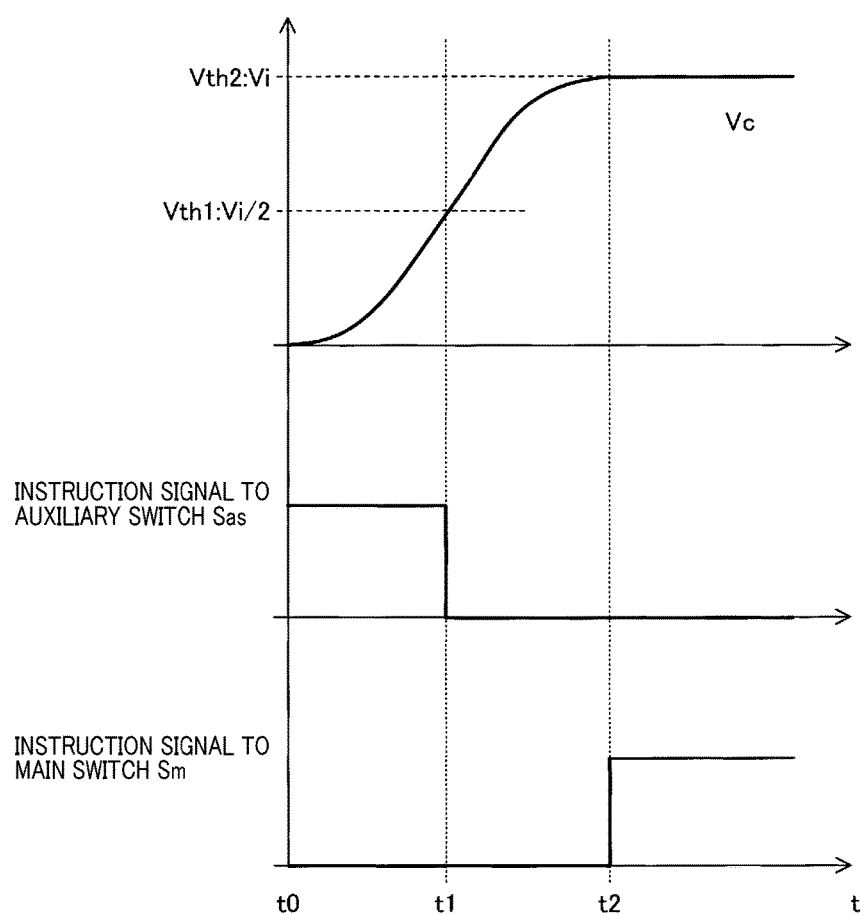
FIG. 15 us a timing chart showing the switching control performed by the control circuit part 4 in the power conversion device 1 according to the first exemplary embodiment.

FIG. 15 us a timing chart showing the switching control performed by the control circuit part 4 in the power conversion device 1 according to the first exemplary embodiment.

As shown in FIG. 15, the timing to turn off the auxiliary switch Sas is determined on the basis of the first threshold voltage Vth1 of the voltage detection part 5.

Figure 16:
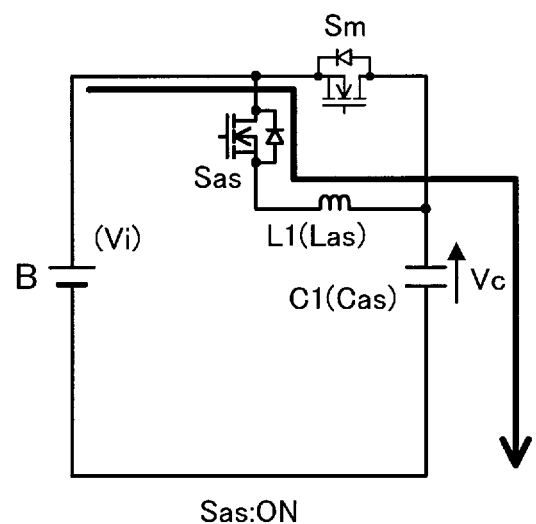
FIG. 16 is a view showing a current path when the main switch Sm is turned on in the power conversion device 1 according to the first exemplary embodiment.

FIG. 16 is a view showing a current path when the main switch Sm is turned on in the power conversion device 1 according to the first exemplary embodiment. During the auxiliary switch Sas is turned on, i.e. during the period from t0 to t1 shown in FIG. 16, the resonance reactor L1 and the resonance capacitor C1 resonate with each other through the battery B, and each of the resonance reactor L1 and the resonance capacitor C1 charges energy.

Figure 17:
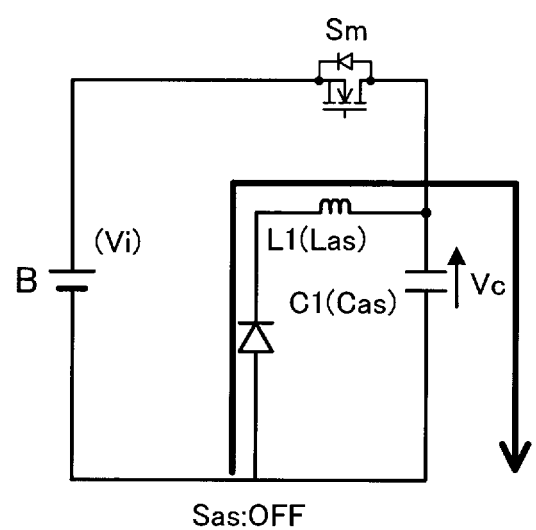
FIG. 17 is a view showing a current path when the main switch Sm is turned off in the power conversion device 1 according to the first exemplary embodiment.

FIG. 17 is a view showing a current path when the main switch Sm is turned off in the power conversion device 1 according to the first exemplary embodiment.

Next, the auxiliary switch Sas is turned off at the first threshold voltage Vth1. During the turned-off state of the auxiliary switch Sas, i.e. during the period from t1 to t2, the resonance reactor L1 and the resonance capacitor C1 resonate with each other, as shown in FIG. 17, and the resonance reactor L1 supplies the energy to the resonance capacitor C1. In order to charge the resonance capacitor C1 to the input voltage Vi at t2, it is preferable to determine the first threshold voltage Vth1 of the voltage detection part 5 so that the following expression (1).

$$\tfrac{1}{2} C_{as} V_i^2 = \tfrac{1}{2} C_{as} V_c^2 + \tfrac{1}{2} L_{as} I_{as}^2 \tag{1}$$

where Cas indicates the capacitance, Vi indicates the input voltage, Vc indicates the capacitor voltage, and Ias indicates the reactor current.

In general, it is possible to express the transient phenomenon of a RLC resonant circuit caused by the switching operation of the auxiliary switch Sas by using the following equation (2). The following equation (3) can be obtained by the Laplace transform of the equation (2).

$$V_i = Ri + L\frac{di}{dt} + \frac{1}{C}\int i\,dt. \tag{2}$$

$$I_{as} = \frac{Vi}{\sqrt{\frac{L_{as}}{C_{as}} - \left(\frac{R}{2}\right)^2}} \cdot e^{-\frac{R}{2L_{as}} \cdot t} \cdot \sin\left(\sqrt{\frac{1}{L_{as}C_{as}} - \left(\frac{R}{2L_{as}}\right)^2} \cdot t\right). \tag{3}$$

When the resistance component R in the equation (3) is disregarded, the equation (4) is obtained. In the equation (4), the reactor current Ias can be expressed by using the capacitor voltage Vc.

$$I_{as} = \sqrt{\frac{C_{as}}{L_{as}}} \cdot V_i \cdot \sqrt{1 - \left(\frac{V_c - V_i}{V_i}\right)^2}. \tag{4}$$

The following equation (5) is obtained by inserting the equation (4) to the equation (1).

$$V_c = \frac{V_i}{2}. \tag{5}$$

That is, according to the equation (5), it can be understood that the reactor current Ias flowing in the auxiliary circuit 3 is reduced to the minimum value and the optimum ZVS is enabled when the value of Vi/2 is assigned to the first threshold voltage Vth1, and the auxiliary switch Sas is turned off when the capacitor voltage Vc reaches the half of the input voltage Vi.

In FIG. 15, when the capacitor voltage Vc reaches the half of the input voltage Vi, the resonance capacitor C1 has a quarter of the voltage necessary to charge the capacitor voltage Vc to the input voltage Vi, and the resonance reactor L1 has ¾ of the voltage necessary to charge the capacitor voltage Vc to the input voltage Vi. The control circuit part 4 detects this state on the basis of the output transmitted from the first comparator 51 in the voltage detection part 5, and the control circuit part 4 turns immediately off the auxiliary switch Sas. This makes it possible to obtain quick responsiveness, and to perform the ZVS by using the ¾ energy charged in the resonance reactor L1. Accordingly, this makes it possible to perform quick response even if the load current rapidly varies. For example, this makes it possible to obtain a high controllability on the basis of the simple turning on/off control when compared with the feedback control based on the detection result of the current sensor.

Figure 18:
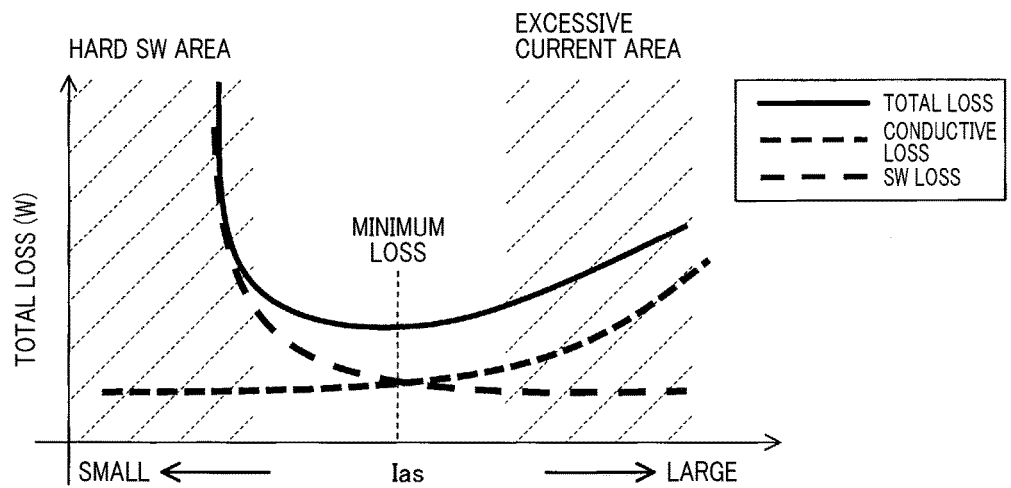
FIG. 18 is a view showing a relationship between a reactor current Ias and an overall loss of the power conversion device 1 according to the first exemplary embodiment.

FIG. 18 is a view showing a relationship between the reactor current Ias and an overall loss of the power conversion device 1 according to the first exemplary embodiment.

As shown in FIG. 18, the overall loss, i.e. the total loss is determined on the basis of the balance of the conductive loss in the auxiliary circuit 3 and the switching loss of the main switch Sm. The lower the first threshold voltage Vth1 is, the shorter the power supplying period, and the reactor current Ias flowing in the auxiliary circuit 3 is reduced, and the conductive loss is also reduced. However, when the reactor current Ias is reduced to less than a predetermined value, the reduction effect of the conductive loss becomes small, and the switching loss of the main switch Sm increases. Accordingly, it is preferable to determine the first threshold voltage Vth1 between the excessive current area and the hard switching area (see FIG. 18) so that the reactor current Ias is within a narrow range which provides a relatively small loss. As shown in FIG. 18, the conductive loss increases in the excessive current area, and the switching loss increases in the hard switching area.

Figure 19:
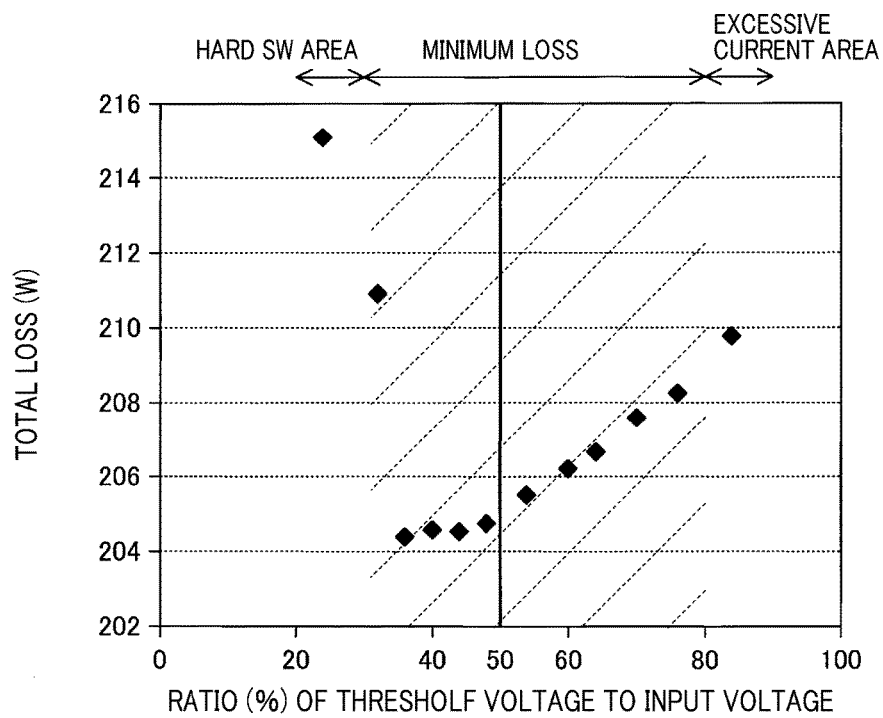
FIG. 19 is a view showing a relationship between the total loss and a ratio of a first threshold voltage Vth1 to an input voltage Vi in the power conversion device 1 according to the first exemplary embodiment.

FIG. 19 is a view showing a relationship between the total loss and a ratio of the first threshold voltage Vth to the input voltage Vi in the power conversion device 1 according to the first exemplary embodiment.

As shown in FIG. 19, when the ratio of the first threshold voltage Vth1 to the input voltage Vi varies, the more the first threshold voltage Vth1 is reduced from 100%, the more the total loss is reduced. It is understood from FIG. 19 that the total loss becomes the minimum value when the ratio of the first threshold value Vth1 to the input voltage Vi is within a range of 30% to 50%.

On the other hand, when the ratio of the first threshold value Vth1 to the input voltage Vi is less than 30%, the switching loss increases, which is larger than that when the ratio of the first threshold value Vth1 to the input voltage Vi is more than 80%.

Accordingly, in order to obtain the desired loss-reduction effect, it is preferable to determine the first threshold voltage Vth1 within the range of 30% to 80% of the ratio of the first threshold value Vth1 to the input voltage Vi. It is more preferable to determine the first threshold voltage Vth1 within the range of 35% to 75% of the ratio of the first threshold value Vth1 to the input voltage Vi. This makes it possible to reduce both the conductive loss and the switching loss simultaneously, and to reduce the total loss.

Further, it is possible to determine the turning-off timing of the auxiliary switch Sas by using the following equation (6) which considers the resistance component R instead of using the equation (1). The following equation (8) is obtained by inserting the equation (7), i.e. the equation (4), into the equation (6).

$$\frac{1}{2}C_{as}V_i^2 = \frac{1}{2}C_{as}V_c^2 + \frac{1}{2}L_{as}I_{as}^2 - \int_0^{\pi\sqrt{LC}/2} RI_{as}^2 dt. \qquad (6)$$

$$I_{as} = \sqrt{\frac{C_{as}}{L_{as}}} \cdot V_i \cdot \sqrt{1 - \left(\frac{V_c - V_i}{V_i}\right)^2}. \qquad (7)$$

$$V_c = \frac{\left\{1 + R\sqrt{\frac{C_{as}}{L_{as}}}(\pi - 1)\right\}}{2}V_i. \qquad (8)$$

It is possible to charge the capacitor voltage Vc to the input voltage Vi when the first threshold voltage Vth1 is determined so that the equation (8) is satisfied, and the auxiliary switch Sas is turned off on the basis of the comparison result of the capacitor voltage Vc.

For example, the calculation results of the first threshold voltage Vth1 are within the range of 30% to 80% of the input voltage Vi as follows, which are obtained by using the equation (8) when the resistance R is changed within the range of 0 to 150 mΩ:

| Resistance component R (mΩ) | First threshold voltage Vth1 |
|---|---|
| 0 | Vi/2 |
| 20 | 53.3% of Vi |
| 40 | 56.6% of Vi |
| 60 | 60.0% of Vi |
| 100 | 67.0% of Vi |
| 150 | 75.0% of Vi |

Accordingly, this adjustment makes it possible to determine the optimum turning-off timing of the auxiliary switch Sas due to the resistance component R, and to obtain the minimum loss on the basis of the ZVS.

The second threshold voltage Vth2 is determined to be larger than the first threshold voltage Vth1, and not more than the input voltage Vi. The closer the second threshold voltage Vth2 is to the input voltage Vi, the more the switching loss is reduced.

Figure 20:
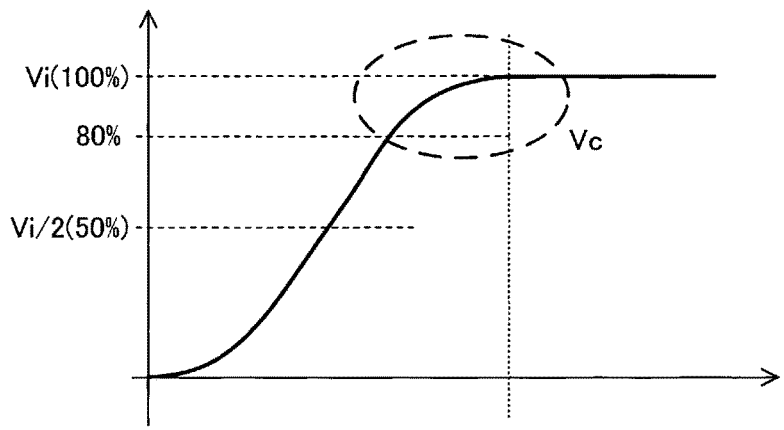
FIG. 20 is a view showing a variation of a capacitor voltage Vc of a resonance capacitor C1 in the power conversion device 1 according to the first exemplary embodiment.

FIG. 20 is a view showing a variation of the capacitor voltage Vc of the resonance capacitor C1 in the power conversion device 1 according to the first exemplary embodiment;

As shown in FIG. 20, because the resonance capacitor C1 resonates, the capacitor voltage Vc of the resonance capacitor C1 changes in a sine curve. For example, the capacitor voltage Vc of the resonance capacitor C1 smoothly changes in the area of not less than 80% of the input voltage Vi.

There is a possible case in which it is preferable for the main switch Sm to have its turning-on timing which is earlier than the timing when the capacitor voltage Vc of the resonance capacitor C1 reaches the input voltage Vi in views of the input/output signals of the voltage detection part 5 and the control circuit part 4, a delayed time of the switching operation, and the variations of the circuit components.

Accordingly, it is preferable to determine the second threshold voltage Vth2 within the range of 80% to 100% of the input voltage Vi. This makes it possible to provide the desired controllability and the loss reduction effects.

Second Exemplary Embodiment

A description will be given of the power conversion device 1 according to a second exemplary embodiment with reference to FIG. 21.

Figure 21:
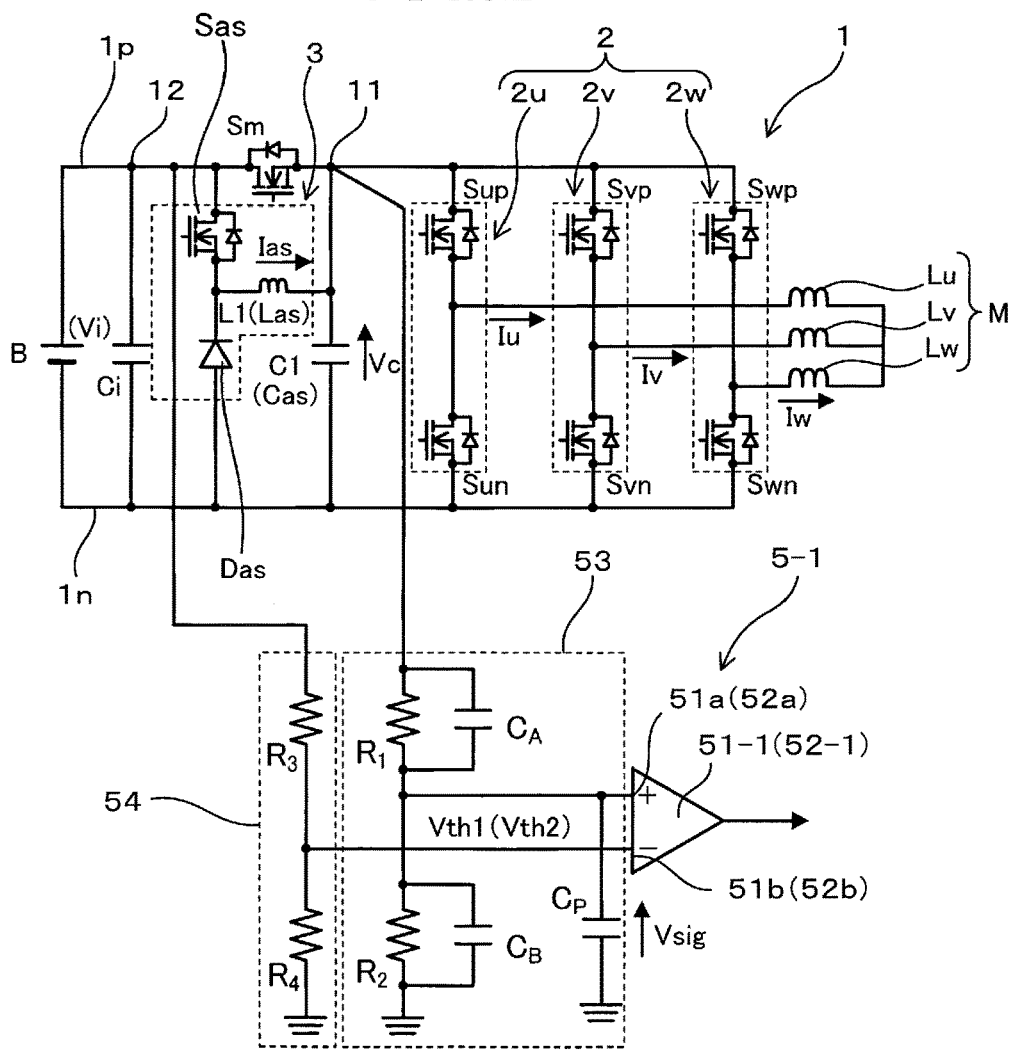
FIG. 21 is a circuit diagram showing a schematic structure of the power conversion device 1 according to a second exemplary embodiment.

FIG. 21 is a circuit diagram showing a schematic structure of the power conversion device 1 according to the second exemplary embodiment. As shown in FIG. 21, the power conversion device 1 according to the second exemplary embodiment has the battery B, the main switch Sm, the output circuit part 2, the auxiliary circuit 3, the resonance capacitor C1, the control circuit part 4, and a voltage detection part 5-1. The main switch Sm is connected to the positive electrode side voltage potential line 1p of the battery B. The output circuit part 2 is an inverter and connected to the alternating current motor M. The auxiliary circuit 3 has the auxiliary switch Sas and the resonance reactor L1. The resonance capacitor C1 is connected to the output terminal of the main switch Sm.

The same components between the second exemplary embodiment and the first exemplary embodiment will be referred with the same reference numbers and characters. The explanation of those same components is omitted here for brevity.

That is, the power conversion device 1 according to the second exemplary embodiment basically and substantially has the same structure of the power conversion device 1 according to the first exemplary embodiment previously described. In the power conversion device 1 according to the second exemplary embodiment, the voltage detection part 5-1 is composed of a first comparator 51-1 and a second comparator 52-1. The first comparator 51-1 and the second comparator 52-1 have a structure which is different from the structure of the first comparator 51 and the second comparator 52 in the voltage detection part 5-1 in the power conversion device 1 according to the first exemplary embodiment.

Because the basic operation of the first comparator 51-1 and the second comparator 52-1 has the same as that of the first comparator 51 and the second comparator 52 in the first exemplary embodiment, the difference between the second exemplary embodiment and the first exemplary embodiment will be explained. That is, the first comparator 51-1 and the second comparator 52-1 perform the basic operation to compare the external side voltage of the main switch Sm (i.e. the capacitor voltage Vc) with the first threshold voltage Vth1 and the second threshold voltage Vth2, respectively, and transmit the comparison result to the control circuit part 4.

In the power conversion device 1 according to the second exemplary embodiment, because the first comparator 51-1 and the second comparator 52-1 have the same structure, FIG. 21 shows the first comparator only for brevity. That is, the first comparator 51-1 and the second comparator 52-1 are designated by using the reference number 51-1 (52-1) in FIG. 21. Accordingly, although the following description will explain the structure and action of the first comparator 51-1 only, the second comparator 52-1 has the same structure and action.

The first comparator 51-1 has a compensation circuit 53 and a voltage divider circuit 54. The compensation circuit 53 supplies the external side voltage of the main switch Sm to the first input terminal 51a of the first comparator 51-1. The voltage divider circuit 54 supplies the first threshold voltage Vth1 to the first reference terminal 51b of the first comparator 51-1. The compensation circuit 53 is composed of two voltage divider resistances R1 and R2 connected in series. Further, a compensation capacitor $C_A$ is connected in parallel to the voltage divider resistance R1. Similarly, the compensation capacitor $C_B$ is connected in parallel to the voltage divider resistance R2. In the series connection part composed of the voltage divider resistance R1 and the voltage divider resistance R2, one terminal of the voltage divider resistance R1 is connected to the connection node 11 at the external side of the main switch Sm, the other terminal of the voltage divider resistance R1 is connected to one terminal of the voltage divider resistance R2. The other terminal of the voltage divider resistance R2 is grounded.

When a low pass filter is formed through the first input terminal 51a of the first comparator 51-1 and a parasitic capacitor Cp of a microcomputer and the terminals of the first comparator 51-1 and the second comparator 52-1, this deteriorates the frequency characteristics of the voltage detection part 5-1, and there is a possible case in which the voltage detection part 5-1 has difficulty detecting high speed signals with high accuracy. In this case, a voltage Vsig of the parasitic capacitor Cp and the capacitor voltage Vc have a relationship designated by the following equation (9).

$$V_{sig} = \frac{R_2}{R_1 \cdot \left(\frac{1 + j\omega R_2(C_2 + C_P)}{1 + j\omega R_1 C_1}\right) + R_2} \cdot V_C. \quad (9)$$

In order to eliminate the term depending on frequency components from the equation (9), i.e. in order for this term to have a value of 1, the equation (9) is converted to the following equation (10). Accordingly, the voltage detection part 5-1 can detect the signals regarding the external side voltage of the main switch Sm without delay when the compensation capacitors $C_A$ and $C_B$ satisfy the equation (10).

$$R_1 C_1 = R_2 (C_2 C_P) \quad (10).$$

The voltage divider circuit 54 is composed of a voltage divider resistance R3 and a voltage divider resistance R4 which are connected in series. The connection node between the voltage divider resistance R3 and the voltage divider resistance R4 is connected to the first reference terminal 51b of the first comparator 51-1 (the second comparator 52-1).

As shown in FIG. 21, one terminal of the voltage divider resistance R3 in the series connection part forming the voltage divider circuit 54 is connected to the positive electrode side voltage potential line 1p at the connection node 12 between the input side terminal of the mains switch Sm and the smoothing capacitor Ci. The other terminal of the voltage divider resistance R4 is grounded. It is possible to divide the input voltage Vi by adjusting the resistance value of each of the voltage divider resistances R3 and R4, and to provide the first threshold voltage Vth1 to the terminal 51b of the first comparator 51-1. For example, the voltage divider resistances R3 and R4 have the same resistance value, the first threshold voltage Vth1 becomes a half of the input voltage Vi (Vth1=Vi/2).

As previously described, the first threshold voltage Vth1 is supplied to the first comparator 51-1 in the voltage detection part 5-1. Similarly, the second threshold voltage Vth 2 (omitted from FIG. 21) is supplied to the second comparator 52-1 (omitted from FIG. 21) in the voltage detection part 5-1.

The control circuit part 4 can receive the precise comparison results of the first comparator 51-1 and the second comparator 52-1 in the voltage detection part 5-1 without delay, and quickly turns on/off the auxiliary switch Sas and the main switch Sm with high responsiveness at an optimum timing. In the second exemplary embodiment, the control circuit part 4 can perform the turning-on/off control of the main switch Sm and the semiconductor switches in the output circuit part 2 with high accuracy and high responsiveness.

Third Exemplary Embodiment

A description will be given of the power conversion device 1 according to a third exemplary embodiment with reference to FIG. 22, FIG. 23 and FIG. 24.

Figure 22:
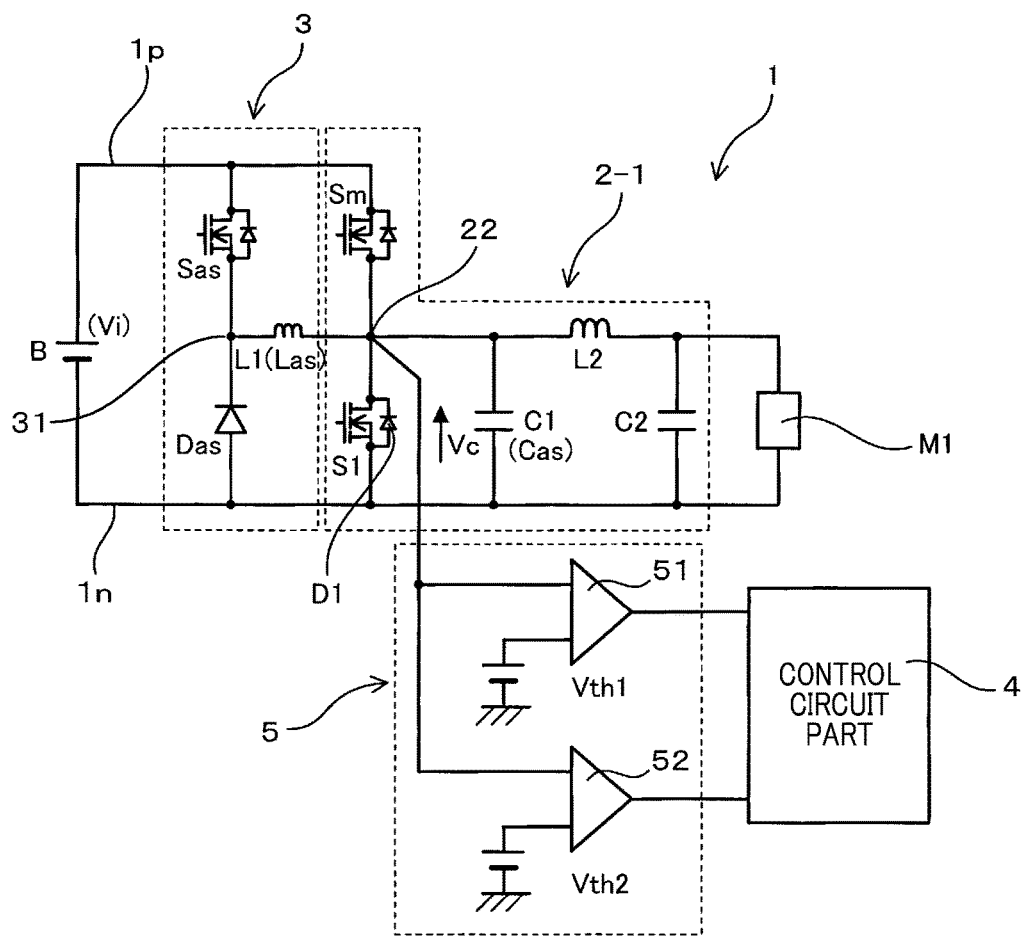
FIG. 22 is a circuit diagram showing a schematic structure of the power conversion device 1 according to a third exemplary embodiment.

FIG. 22 is a circuit diagram showing a schematic structure of the power conversion device 1 according to the third exemplary embodiment. As shown in FIG. 22, the power conversion device 1 according to the third exemplary embodiment has the battery B, the main switch Sm, an output circuit part 2-1, the auxiliary circuit 3, the resonance capacitor C1, the control circuit part 4, and the voltage detection part 5.

The power conversion device 1 according to the third exemplary embodiment basically and substantially has the same structure of the power conversion device 1 according to the first exemplary embodiment previously described. In the power conversion device 1 according to the third exemplary embodiment, the output circuit part 2-1 has a structure which is different from the structure of the output circuit part 2 in the power conversion device 1 according to the first exemplary embodiment.

The same components between the third exemplary embodiment and the first exemplary embodiment will be referred with the same reference numbers and characters. The explanation of those same components is omitted here for brevity.

The output circuit part 2-1 has a synchronous switch S1 connected in series to the main switch Sm. One terminal of the reactor L2 is connected to a connection node 22 between the main switch Sm and the synchronous switch S1. For example, a direct current motor M1 is connected as a load to the connection node between the other terminal of the reactor L2 and the negative electrode side voltage potential line 1n. Further, the capacitor C2 is connected to the connection node between the other terminal of the reactor L2 and the negative electrode side voltage potential line 1n. That is, as shown in FIG. 22, the direct current motor M1 and the capacitor C2 are connected in parallel between the reactor L2 and the negative electrode side voltage potential line 1n.

For example, the synchronous switch S1 is composed of a semiconductor power element such as a metal oxide semiconductor field effect transistor (MOS FET). A diode D is connected in reverse direction between the drain and source of the MOS FET. It is acceptable to use a semiconductor switching element or a diode instead of the MOS FET.

The output circuit part 2-1 forms a step-down type direct-current to direct current converter (step-down type DC-DC converter) capable of converting a direct current power supplied from the battery B to a direct current power. The output circuit part 2-1 alternately turning on/off the main switch Sm and the synchronous switch S1 to generate rectangular shaped waves. The filter circuit composed of the reactor L2 and the capacitor C2 smoothes the rectangular shaped waves and outputs a direct current power.

The resonance reactor L1 in the auxiliary circuit 3 is connected between the connection node 31 and the connection node 22. The resonance capacitor C1 is connected between the connection node 22 and the reactor L2 in parallel to the synchronous switch S1.

The voltage detection part 5 in the third exemplary embodiment has the structure which is the same as that of the voltage detection part 5 in the first exemplary embodiment. That is, the first comparator 51 and the second comparator 52 are connected to the connection node 22, and receive the external side voltage of the main switch Sm (i.e. receive the capacitor voltage Vc). The first comparator 51 and the second comparator 52 compare with the first threshold voltage Vth1 and the second threshold voltage Vth2, respectively, and transmit the comparison results to the control circuit part 4.

The other components in the power conversion device 1 according to the third exemplary embodiment have the same structure of those in the power conversion device 1 according to the first exemplary embodiment. The explanation of the same components between the third exemplary embodiment and the first exemplary embodiment is omitted here for brevity.

Figure 23:
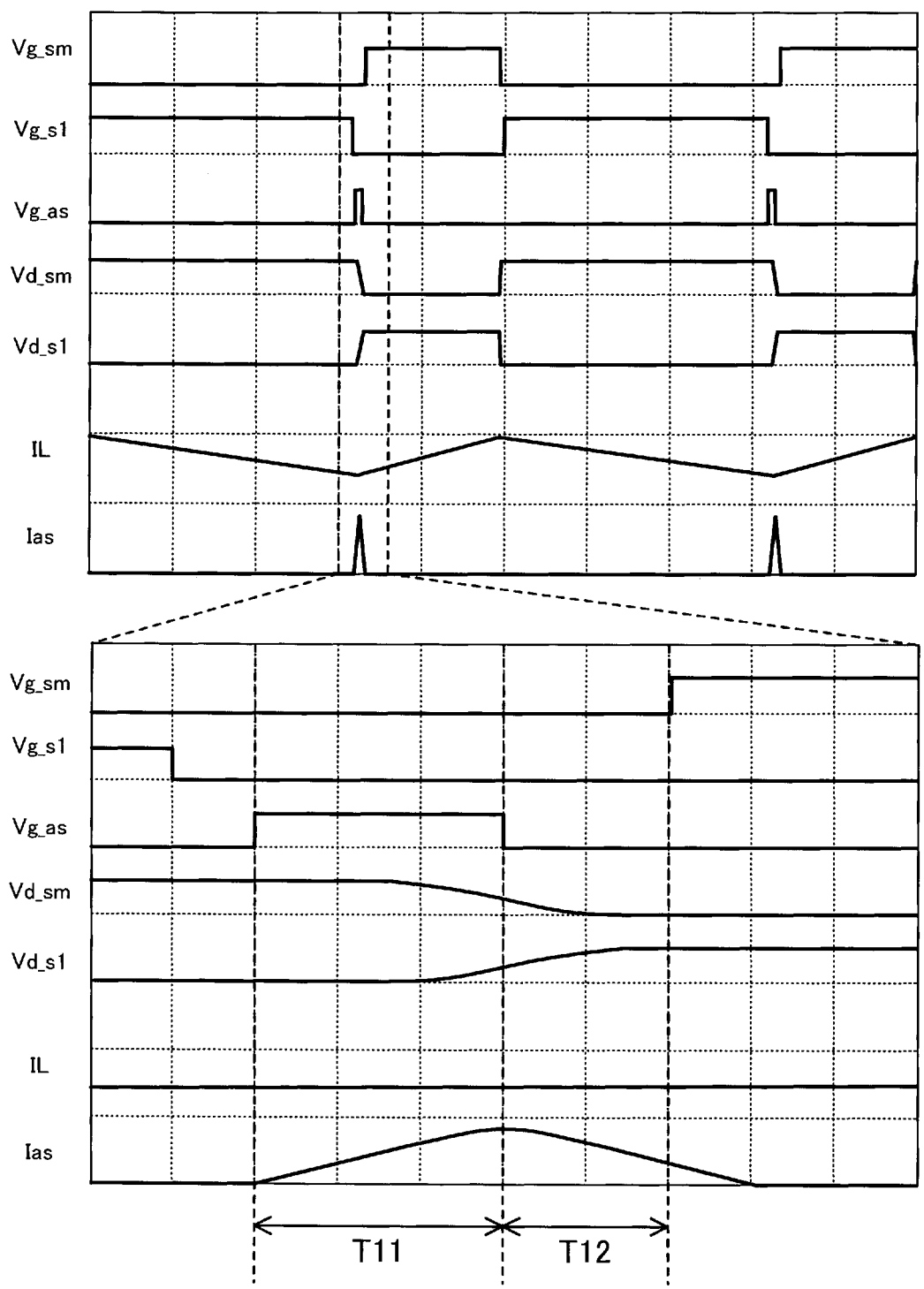
FIG. 23 is a timing chart showing the operation states of the main switch Sm and the semiconductor switches in the output circuit part in the power conversion device 1 according to the third exemplary embodiment.

FIG. 23 is a timing chart showing the operation states of the main switch Sm and the semiconductor switches in the output circuit part 2 in the power conversion device 1 according to the third exemplary embodiment.

As shown in FIG. 23, the control circuit part 4 generates and transmits control signals to the main switch Sm, the synchronous switch S1 and the auxiliary switch Sas. That is, the control circuit part 4 adjusts the gate voltage Vg_sm of the main switch Sm, the gate voltageVg_s1 of the synchronous switch S1 and the gate voltage Vg_as of the auxiliary switch Sas so as to turn them on/off.

A description will now be given of the operation of the main switch Sm, the synchronous switch S1 and the auxiliary switch Sas during a part of one switching period of the main switch Sm, which includes a turned-on period of the auxiliary switch Sas, with reference to FIG. 23. The lower part in FIG. 23 is an elongated view of the upper part in FIG. 23.

The switching operation to turn the main switch Sm and the auxiliary switch Sas on/off in the third exemplary embodiment is the same as that of the main switch Sm and the auxiliary switch Sas in the first exemplary embodiment shown in FIG. 9. The switching operation to turn the synchronous switch S1 on/off due to the gate voltage Vg_s1 corresponds to the switching operation to turn the semiconductor switch Sun on/off due to the gate voltage Vg_sun in the first exemplary embodiment shown in FIG. 9. The reactor current IL flowing in the reactor L2 corresponds to the phase current Iu shown in FIG. 9.

During the periods T11 and T12 in which the main switch Sm is switched to the turned-on state from the turned-off state when the synchronous switch S1 is switched to the turned-on state from the turned-on state, the auxiliary switch Sas is turned on/off so as to charge the resonance capacitor C1. Specifically, the main switch Sm is turned off and the synchronous switch S1 is switched to the turned-on state from the turned-off state before the period T11. After this, during the period T11, the auxiliary switch Sas is turned on when the gate voltage Vg_as of the auxiliary switch Sas is switched to the high level. This generates a current path from the resonance reactor L1 to the negative electrode side voltage line 1n through the connection node 22, the reactor L2 and the direct current motor M1.

When the current path is generated, the reactor current Ias flowing in the auxiliary circuit 3 gradually increases. When the reactor current Ias becomes not less than the reactor current IL, a charging current is flowing into the resonance capacitor C1, and the capacitor voltage Vc starts to increase. At the same time, the drain-source voltage Vds_sm of the main switch Sm is gradually reduced, and the drain-source voltage Vds_s1 of the synchronous switch S1 gradually increases.

Similar to the case shown in the first exemplary embodiment, the first comparator 51 in the voltage detection part 5 receives the voltage at the connection node 22. The first comparator 51 compares the received voltage at the connection node 22 with the first threshold voltage Vth1, and transmits the comparison result to the control circuit part 4. The control circuit part 4 performs the switching operation to turn the auxiliary switch Sas on/off at the optimum timing on the basis of the received comparison result transmitted from the first comparator 51 in the voltage detection part 5.

During the period T12 after the period T11, the second comparator 52 in the voltage detection part 5 receives the voltage at the connection node 22. The second comparator 52 compares the received voltage at the connection node 22 with the second threshold voltage Vth2, and transmits the comparison result to the control circuit part 4. The control circuit part 4 performs the switching operation to turn the main switch Sm on/off at the optimum timing on the basis of the received comparison result transmitted from the second comparator 52 in the voltage detection part 5.

Figure 24:
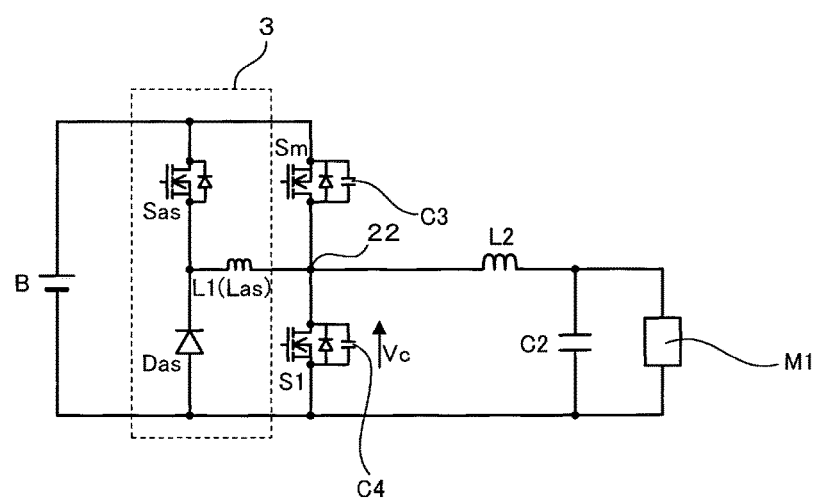
FIG. 24 is a circuit diagram showing a schematic structure of a modification of the power conversion device 1 according to the third exemplary embodiment.

FIG. 24 is a circuit diagram showing a schematic structure of a modification of the power conversion device 1 according to the third exemplary embodiment.

As shown in FIG. 24, instead of using the resonance capacitor C1, it is acceptable to use a parasitic capacitor C3, arranged in parallel to the main switch Sm, as the drain-source voltage of the main switch Sm, and to use a parasitic capacitor C4, arranged in parallel to the synchronous switch S1, as the drain-source voltage of the synchronous switch S1. This structure allows the resonance capacitors C3 and C4 to be arranged close to the main switch Sm, it is possible for the power conversion device 1 according to the third exemplary embodiment to have a low inductance structure.

The concept of the present invention is not limited by the first, second and third exemplary embodiments. It is possible for the present invention to have various modifications. For example, it is acceptable for the power conversion device to have plural main switches Sm, and for the output circuit part 2 to have a plurality of the half bridge circuits. Further, it is also acceptable for the power conversion device to have a plurality of the output circuit parts 2. In this case, each of the plurality of the output circuit parts 2 has a plurality of the half bridge circuits, and the plurality of the output circuits 2 are arranged in parallel.

In each of the first, second and third exemplary embodiments, the power conversion device 1 is connected to the alternating current motor M or the direct current motor M1, and used as an inverter or a converter. The concept of the present invention is not limited by the first, second and third exemplary embodiments. It is possible to connect the power conversion device to an in-vehicle device in addition to the alternating current motor M or the direct current motor M1. It is also acceptable for the power conversion device 1 to use signals of sine curve waves instead of using pulse signals of rectangular shaped waves to perform the inverter operation.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A power conversion device comprising:
   a battery arranged between and connected to a positive electrode side voltage potential line and a negative electrode side voltage potential line, the battery supplying a direct current power;
   a main switch connected to the positive electrode side voltage potential line;
   a semiconductor power element or a plurality of semiconductor power elements arranged between and connected to the main switch and the negative electrode side voltage potential line;
   an auxiliary circuit comprising an auxiliary switch, a resonance reactor and an auxiliary diode, the auxiliary switch and the resonance reactor being connected to the main switch, and the auxiliary diode being connected to the negative electrode side voltage potential line and a connection node between the auxiliary switch and the resonance reactor;
   a voltage detection part connected to an external side of the main switch to detect an external side voltage of the main switch; and
   a control circuit part connected to the voltage detection part, and configured to perform a switching control of the main switch and the auxiliary switch on the basis of a detection result transmitted from the voltage detection part, and the control circuit part turning off the auxiliary switch before the external side voltage of the main switch reaches an input voltage of the main switch supplied from the battery, and the external side voltage of the main switch increasing by turning on the auxiliary switch.

2. The power conversion device according to claim 1, further comprising an output circuit part comprising a plurality of half bridge circuits capable of converting the direct current power of the battery to an alternating current power, and supplying the alternating current power to a load, wherein each of the plurality of half bridge circuit comprises the plurality of semiconductor power elements connected in a bridge connection structure.

3. The power conversion device according to claim 2, wherein the control circuit part turns off the auxiliary switch when the external side voltage of the main switch is not less than a first threshold voltage which is lower than the input voltage of the main switch, the first threshold voltage being lower than the input voltage of the main switch, and
   the control circuit part turns on the main switch when the external side voltage of the main switch is not less than a second threshold voltage, where the second threshold voltage is higher than the first threshold voltage.

4. The power conversion device according to claim 3, wherein the first threshold voltage is within a range of 30% to 80% of the input voltage of the main switch.

5. The power conversion device according to claim 3, wherein the second threshold voltage is not less than 80% of the input voltage of the main switch.

6. The power conversion device according to claim 2, wherein the voltage detection part comprises;
   a first comparator comprising a first input terminal and a first reference terminal; and
   a second comparator comprising a second input terminal and a second reference terminal, wherein
   the first comparator compares the external side voltage of the main switch received through the first input terminal with the first threshold voltage received through the first reference terminal, and generates and transmits a comparison result to the control circuit part, and the second comparator compares the external side voltage of the main switch received through the second input terminal with the second threshold voltage received through the second reference terminal, and generates and transmits a comparison result to the control circuit part.

7. The power conversion device according to claim 6, wherein each of the first comparator and the second comparator comprises a compensation circuit which comprises resistances and compensation capacitors connected in parallel to respective resistances.

8. The power conversion device according to claim 1, further comprising a reactor, a capacitor and an output circuit part,
   wherein the main switch and the semiconductor power element are connected in series, one terminal of the reactor is connected to a connection node between the main switch and the semiconductor power element, the other terminal of the reactor is connected to the capacitor, and the direct current power of the battery is converted to a direct current power having a voltage which is different from a voltage of the direct current power of the battery by a combination of the main switch, the semiconductor power element, the reactor and the capacitor, and the output circuit part transmits the converted direct current power to a load.

9. The power conversion device according to claim 1, wherein each of the plurality of semiconductor power elements is composed of a semiconductor switching element or a diode.

10. The power conversion device according to claim 1, wherein the control circuit part turns off the auxiliary switch when the external side voltage of the main switch is not less than a first threshold voltage which is lower than the input voltage of the main switch, the first threshold voltage being lower than the input voltage of the main switch, and
    the control circuit part turns on the main switch when the external side voltage of the main switch is not less than a second threshold voltage, where the second threshold voltage is higher than the first threshold voltage.

11. The power conversion device according to claim 10, wherein the first threshold voltage is within a range of 30% to 80% of the input voltage of the main switch.

12. The power conversion device according to claim 10, wherein the second threshold voltage is not less than 80% of the input voltage of the main switch.

13. The power conversion device according to claim 1, wherein the voltage detection part comprises;
- a first comparator comprising a first input terminal and a first reference terminal; and
- a second comparator comprising a second input terminal and a second reference terminal, wherein
- the first comparator compares the external side voltage of the main switch received through the first input terminal with the first threshold voltage received through the first reference terminal, and generates and transmits a comparison result to the control circuit part, and the second comparator compares the external side voltage of the main switch received through the second input terminal with the second threshold voltage received through the second reference terminal, and generates and transmits a comparison result to the control circuit part.

14. The power conversion device according to claim 13, wherein each of the first comparator and the second comparator comprises a compensation circuit which comprises resistances and compensation capacitors connected in parallel to respective resistances.

\* \* \* \* \*